(12) United States Patent
Manabe et al.

(10) Patent No.: US 7,679,264 B2
(45) Date of Patent: Mar. 16, 2010

(54) DRIVING MECHANISM

(75) Inventors: Mitsuo Manabe, Saitama (JP); Ryota Sasaki, Saitama (JP); Takeshi Ichimiya, Saitama (JP); Tohru Eguro, Saitama (JP); Motoyoshi Tokumiya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 7 days.

(21) Appl. No.: 11/387,726

(22) Filed: Mar. 24, 2006

(65) Prior Publication Data
US 2007/0075610 A1 Apr. 5, 2007

(30) Foreign Application Priority Data

| Sep. 30, 2005 | (JP) | P. 2005-288632 |
| Nov. 24, 2005 | (JP) | P. 2005-338919 |
| Nov. 24, 2005 | (JP) | P. 2005-338926 |
| Nov. 24, 2005 | (JP) | P. 2005-338935 |
| Feb. 2, 2006 | (JP) | P2006-026244 |

(51) Int. Cl.
*H01L 41/08* (2006.01)

(52) U.S. Cl. .................. 310/323.02; 310/317

(58) Field of Classification Search ......... 310/323.02, 310/328, 316.02
See application file for complete search history.

(56) References Cited

U.S. PATENT DOCUMENTS 5,589,723 A * 12/1996 Yoshida et al. ............. 310/328
6,134,057 A * 10/2000 Ueyama et al. ............. 359/821
6,483,226 B1 11/2002 Okoda
6,512,321 B2 * 1/2003 Yoshida et al. .......... 310/316.01
6,528,926 B2 * 3/2003 Okamoto et al. ........ 310/323.17
6,717,329 B2 * 4/2004 Yoshida et al. .......... 310/316.02
6,803,699 B2 * 10/2004 Yuasa et al. ................. 310/317
6,836,057 B2 12/2004 Hata
2003/0168940 A1 9/2003 Kurita et al.
2006/0061234 A1 * 3/2006 Ito et al. ..................... 310/317

FOREIGN PATENT DOCUMENTS

| JP | 11-194258 A | 7/1999 |
| JP | 3171187 B2 | 3/2001 |
| JP | 2002-95274 A | 3/2002 |
| JP | 2002-142470 A | 5/2002 |
| JP | 2003-324979 | 11/2003 |

* cited by examiner

*Primary Examiner*—Mark Budd
(74) *Attorney, Agent, or Firm*—Birch, Stewart, Kolasch & Birch, LLP

(57) ABSTRACT

A driving mechanism comprises: (i) an actuator comprising: an electro-mechanical conversion element; and a driving member which moves according to elongation and contraction of the electro-mechanical conversion element; (ii) a driven member frictionally engaged with the driving member; and (iii) a case, wherein the actuator allows the driven member to move along the driving member, and the actuator is supported by the case laterally in elongating and contracting directions of the electro-mechanical conversion element.

24 Claims, 23 Drawing Sheets

FIG. 3

|  | 1 | 2 | 4 | 5 | 6 |
|---|---|---|---|---|---|
| E(Pa) | 6.00E+07 | 3.00E+08 | 1.00E+09 | 1.2E+11 | 2E+11 |
| A(m$^2$) | 3.50E-06 | 3.50E-06 | 3.50E-06 | 3.50E-06 | 3.50E-06 |
| Ma(kg) | 8.00E-06 | 8.00E-06 | 8.00E-06 | 8.00E-06 | 8.00E-06 |
| Mb(kg) | 3.00E-05 | 3.00E-05 | 3.00E-05 | 3.00E-05 | 3.00E-05 |
| Mc(kg) | 2.08E-05 | 2.08E-05 | 2.08E-05 | 2.08E-05 | 2.08E-05 |
| h(m) | 5.00E-04 | 5.00E-04 | 5.00E-04 | 5.00E-04 | 5.00E-04 |
| fo(kHz) | 1.54E+01 | 3.44E+01 | 6.28E+01 | 6.88E+02 | 8.88E+02 |

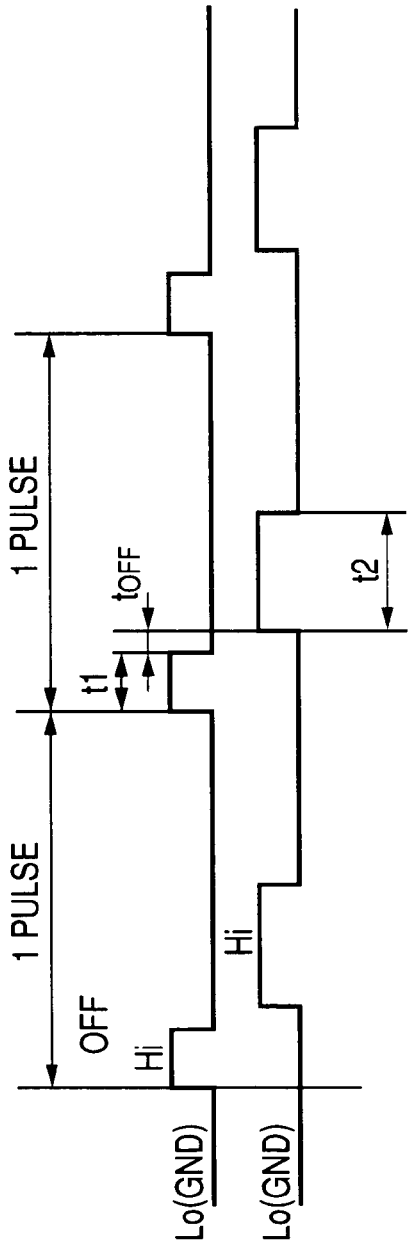
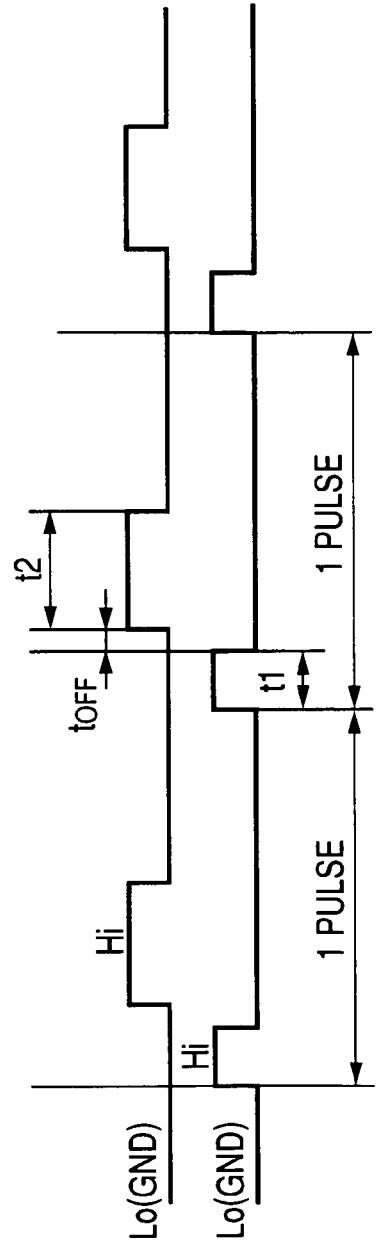

DRIVING MECHANISM

BACKGROUND OF THE INVENTION

1. Field of the Invention

The present invention relates to a driving mechanism in which an actuator is used, and, in particular, to a driving mechanism for driving an optical member such as a relatively small-sized lens to be mounted, for example, on a small digital camera, a web camera and a camera-equipped cellular phone.

2. Description of the Related Art

A piezoelectric element-used actuator is known as a driving mechanism for a lens used in a digital camera and the like. For example, the actuator disclosed in JP-A-2002-142470 is constituted by a piezoelectric element, a driving member and a base. A driving member is bonded to the one end surface of the piezoelectric element in the elongating and contracting direction, and a driven member is frictionally engaged with the driving member. Further, a base is bonded to the other end surface of the piezoelectric element in the elongating and contracting direction. The above-mentioned constitution makes it possible to transmit a movement of a piezoelectric element in the elongating and contracting direction to the driving member when a pulse voltage is applied to the piezoelectric element. Where the piezoelectric element deforms gradually, the driven member moves together with the driving member. Where the piezoelectric element deforms at a great speed, the driven member remains at the same position due to inertia of the mass. Accordingly, application of a pulse voltage is repeated, thereby allowing the driven member to move intermittently at a fine pitch.

The thus constituted actuator may pose a problem that the actuator resonates between a base, piezoelectric element and driving member. Further, in order to suppress the resonance effect on attachment to a body, in the actuator disclosed in JP-A-2002-142470, the base is bonded to the body by use of a rubber-based adhesive agent, thereby supporting the actuator to the body in an elastic manner. However, this driving method is extremely difficult in controlling a constitutional variation in the base, the piezoelectric element and the driving member.

Utilization of the above-described resonance is advantageous in that movement amount of the driving member is increased. An actuator utilizing resonance has been disclosed, for example, in Japanese Patent No. 3171187. According to the actuator, a pulse voltage is applied in accordance with displacement of a piezoelectric element on resonance thereby increasing a displacement amount of a driven member.

However, in the actuators disclosed in JP-A-2002-142470 and Japanese Patent No. 3171187, when an attempt is made to utilize a resonance state which occurs inside the actuator constituted by a piezoelectric element, driving member and base, a problem occurs that the driving member is affected by the resonance and displaced in a direction other than the elongating and contracting direction of the piezoelectric element. For example, as shown in FIG. 27A and FIG. 27B, a problem occurs that the driving member 2 is affected by the resonance and displaced in a direction other than the elongating and contracting direction of the piezoelectric element. Therefore, a driving force generated by the elongation and contraction of the piezoelectric element 1 is not accurately transmitted to a driven shaft 14, thereby making it difficult to correctly move the driven shaft 14 in the elongating and contracting direction of the piezoelectric element 1.

In order to solve the above-described problems, it is necessary to support the actuator to a body (fixed frame) so that the actuator is less affected by resonance. A method for supporting an actuator is proposed, for example, in JP-A-2002-95274, in which the actuator is supported by use of a driving shaft or a driven member other than a piezoelectric element.

However, in the actuator disclosed in JP-A-2002-95274, a driving shaft is attached to one side of a piezoelectric element, and while the other side is free. Therefore, a problem occurs that when a high-frequency voltage is applied to the piezoelectric element to elongate and contract, a problem occurs that the free other side is greatly displaced but the driving shaft side is hardly displaced to fail in gaining a sufficient driving force of a driven member. Therefore, it is necessary to attach a weight member to the other side of the piezoelectric element. In this case, as described above, a problem occurs that a resonance is generated between the piezoelectric element, the weight member and the driving shaft, thereby making it impossible to accurately move the driven member.

SUMMARY OF THE INVENTION

The present invention has been made in view of the above problems, an object of which is to provide a driving mechanism which is less affected by resonance and also able to gain driving force of a driven member reliably.

More specifically, the driving mechanism according to the present invention comprises: (i) an actuator comprising: an electro-mechanical conversion element; and a driving member which moves according to elongation and contraction of the electro-mechanical conversion element; (ii) a driven member frictionally engaged with the driving member; and (iii) a case, wherein the actuator allows the driven member to move along the driving member, and the actuator is supported by the case laterally in elongating and contracting directions of the electro-mechanical conversion element.

According to the present invention, the actuator is supported laterally in the elongating and contracting direction of the electro-mechanical conversion element, by which vibration is not likely to be transmitted between the actuator and an external member, thereby reducing the effect of resonance. It is, therefore, possible to correctly move a driven member. Further, where the actuator is supported laterally, it is more preferable that the actuator is supported laterally all over the circumference in a sense of a stable support of the actuator. Where the actuator is supported laterally in three directions or in two opposing directions, the actuator can be stably supported. Further, it is the same even if the actuator is supported laterally in one direction as long as the contact range can be secured to some degrees.

In addition, in the driving mechanism according to the present invention, it is preferable that the actuator is supported by the case by means of a support member. In this case, the support member is a member, a certain part of which is at least partially in contact with the actuator and the case for the purpose of keeping the positional relationship of the actuator with the case.

Further, in the driving mechanism according to the present invention, it is preferable that the actuator is supported by the case via a filler. In this case, the filler is not limited to a liquid or a gel substance but includes a variety of members used in filling a clearance. In other words, it is a member, a certain part of which is at least partially in contact with the actuator and the case for the purpose of keeping the positional relationship of the actuator with the case.

Further, in the driving mechanism according to the present invention, it is preferable that the filler is formed by an adhesive agent. In the driving mechanism according to the present invention, it is also preferable that the filler is formed by a plurality of adhesive agents.

Further, in the driving mechanism according to the present invention, it is preferable that the support member has elasticity. In the driving mechanism according to the present invention, it is also preferable that the filler has elasticity.

Further, in the driving mechanism according to the present invention, it is preferable that the case comprises a partition wall for preventing discharge of the filler.

Further, it is preferable that the driving mechanism according to the present invention further comprises: a first filling portion for supporting the driving member to the case; and a second filling portion for supporting the electro-mechanical conversion element to the case. In the driving mechanism according to the present invention, it is also preferable that the first filling portion is for a temporary fixture. In the driving mechanism according to the present invention, it is preferable that the first filling portion is a bearing for supporting the driving member in the vicinity of the electro-mechanical conversion element and is provided at a portion adjacent to the second filling portion.

Further, in the driving mechanism according to the present invention, it is preferable that the electro-mechanical conversion element has on its outer surface a terminal to which a wiring member for inputting electric signals is connected, and the support member or the filler covers a portion connecting the terminal with the wiring member.

Further, in the driving mechanism according to the present invention, it is preferable that the driving member is supported on at least one of its leading end side and its base end side, so as to move in elongating and contracting directions of the electro-mechanical conversion element.

Further, in the driving mechanism according to the present invention, it is preferable that the actuator is supported so as to move in elongating and contracting directions of the electro-mechanical conversion element.

Further, in the driving mechanism according to the present invention, it is preferable that the actuator further comprises a weight member attached to the electro-mechanical conversion element on the opposing side to the driving member.

Further, it is preferable that the driving mechanism according to the present invention further comprises a driving section that generates asymmetric signals in the elongating and contracting directions so as to drive the electro-mechanical conversion element.

Further, in the driving mechanism according to the present invention, it is preferable that the driven member is in surface contact with the driving member.

Further, it is preferable that the driving mechanism according to the present invention further comprises a detecting section that detects a movement position of the driven member.

Further, in the driving mechanism according to the present invention, it is preferable that the electro-mechanical conversion element is driven at a driving frequency exceeding an audible frequency.

Further, in the driving mechanism according to the present invention, it is preferable that the driven member is an optical member or a member attached to the optical member and is used for a photographic optical system. In this case, the optical member is not limited only to a lens and the driven member is used as a diaphragm, shutter, ND filter and the like.

Further, in the driving mechanism according to the present invention, it is preferable that the actuator is used in a photographic optical system mounted on a cellular phone. In this case, the actuator is not limited to a photographic optical system mounted on a cellular phone, but may be used as a relatively small-sized photographic optical system such as a web camera and a small-sized digital camera.

BRIEF DESCRIPTION OF THE DRAWINGS

FIG. 3 is a drawing showing a calculation example of resonance frequency;

FIGS. 14A and 14B are wave pattern views of an input signal input into the driving circuit in FIG. 13;

DETAILED DESCRIPTION OF THE INVENTION

Hereinafter, a detailed description is given for embodiments of the present invention with reference to the drawings. In explaining the drawings, the same element is given the same symbol to omit an overlapping explanation.

First Embodiment

First, a description is given for a driving mechanism according to a first embodiment of the present invention.

Figure 1:
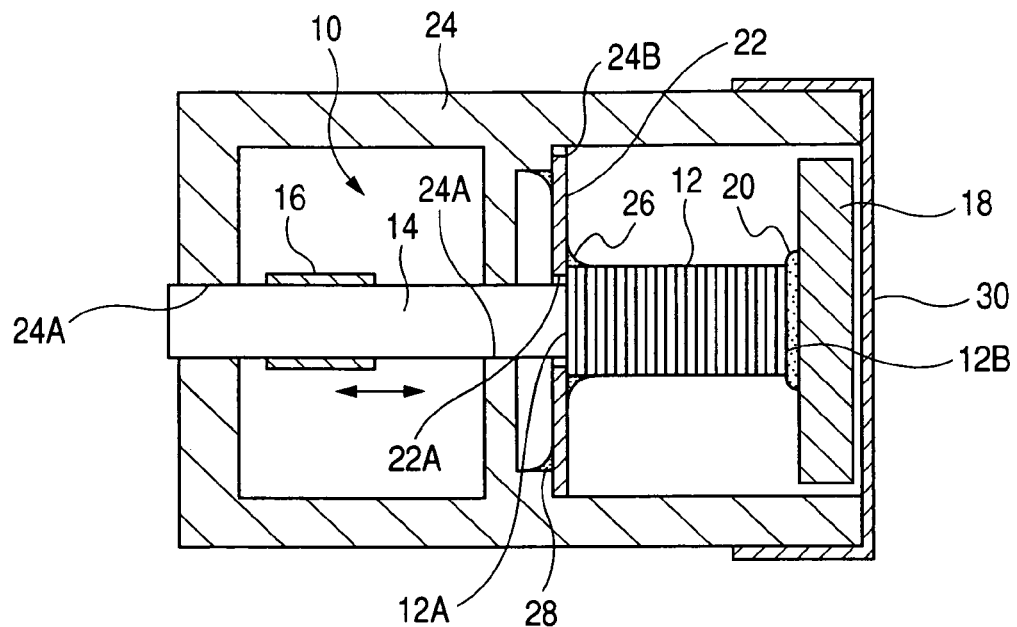
FIG. 1 is a sectional view showing a first embodiment of the driving mechanism according to the present invention.

FIG. 1 is a schematic structure diagram showing the driving mechanism according to the first embodiment. The driving mechanism in the diagram is provided with an actuator 10 and a support member 22 which supports the actuator 10 to a fixed frame 24.

The actuator 10 is provided with a piezoelectric element (corresponding to an electro-mechanical conversion element) 12, a driving shaft (corresponding to a driving friction member) 14 and a weight member 18. The piezoelectric element 12 is constituted by being laminated in the arrow direction. It is constituted so as to deform in a laminated direction (elongation and contraction) by application of a voltage. Therefore, the piezoelectric element 12 is designed so that end surfaces 12A and 12B in the longitudinal direction are displaced.

Of the end surfaces 12A and 12B of the piezoelectric element 12, to one end surface 12A is bonded a base end of the driving shaft 14. The driving shaft 14 is formed, for example, in a cylindrical shape, and its axis is arranged in the arrow direction (namely, in the elongating and contracting direction of the piezoelectric element). The driving shaft 14 is suitably made of a light and high rigid material. As a material satisfying the conditions, beryllium is ideal, however, the material has disadvantages that the cost is high and the workability is poor because it is a rare metal. Next, in the present embodiment, a graphite composite in which graphite crystals are rigidly combined, for example, carbon graphite, is used (In this case, the graphite composite is a composite composed of graphite, namely hexagonal plate crystal of carbon, and substances other than graphite, the carbon graphite is a substance composed of graphite and amorphous carbon, and graphite is also called black lead). Carbon graphite which is one type of graphite composite has characteristics similar to beryllium in characteristics (specific gravity of beryllium is approximately 1.85 and that of carbon graphite is approximately 1.8) but relatively inexpensive unlike beryllium and also better in workability. The driving shaft 14 is not limited in configuration to a cylindrical shape but may be available in a rectangular shape.

A driven member 16 is a member connected to a lens frame (not shown), engaged with the driving shaft 14 at a predetermined frictional force and supported so as to slide along the driving shaft 14. Frictional force between the driven member 16 and the driving shaft 14 is set in such a way that, on application of a gradually changing voltage to the piezoelectric element 12, the static frictional force is greater than the driving force and, on application of an abruptly changing voltage to the piezoelectric element 12, the static frictional force is smaller than the driving force. Further, a lubricant is applied to a range where the driving shaft 14 slides to be in contact with the driven member 16 to stabilize the movement and also improve the durability on a repeated driving. It is preferable that the lubricant is one that is difficult to change in performance by temperatures so as not to increase a sliding and driving resistance of the driving shaft 14 with the driven member 16. It is also preferable that the lubricant will not produce dust and the like which may affect optical parts and mechanical parts.

The weight member 18 is bonded by an adhesive agent 20 to an end surface 12B of the piezoelectric element 12. It is preferable that the weight member 18 prevents the end face 12A from displacing larger than the end face 12B by application of a load to the end face 12B of the piezoelectric element 12, and is larger than the driving shaft 14 in weight. Further, the weight member 18 greater in mass than the driving shaft 14 is provided, thereby making it possible to effectively transmit the elongation and contraction of the piezoelectric element 12 to the driving shaft 14. For example, where the driving shaft 14 is 8 mg and the piezoelectric element 12 is 30 mg, the weight member 18 of 20 mg is used.

Further, the weight member 18 is made of a flexible material. The weight member 18 is made of a material whose Young's modulus is smaller than that of the piezoelectric element 12 and that of the driving shaft 14. The Young's modulus of the weight member 18 is preferably 10 Pa or lower, and more preferably 300 MPa or lower. The above-described weight member 18 is made by mixing an elastic body such as rubber with metal powders with a greater specific gravity. It is manufactured, for example, by mixing urethane rubber and urethane resin with tungsten powders. The specific gravity of the weight member 18 is preferably as high as possible for miniaturizing a mechanism, and established to be 8 to 12, for example. Further, the weight member 18 produced by mixing urethane rubber or urethane resin with tungsten powders is approximately 60 MPa in Young's modulus and approximately 11.7 in specific gravity. Therefore, where the weight member 18 is designed to be as small as possible in volume, a combination of the specific gravity as great as possible and the Young's modulus as small as possible is optimum, however, any substance is usable as the weight member 18, as long as it is greater in specific gravity than the driving shaft 14 (the specific gravity of 1.8 or greater) and 1 GPa or lower in Young's modulus. More specifically, if a substance has a value which is obtained by dividing the specific gravity by Young's modulus (specific gravity/Young's modulus) is $18 \times 10^{-9}$ or greater, it is suitable as the weight member 18. It is preferable to use an elastic adhesive agent as an adhesive agent for fastening the weight member 18 to the piezoelectric element 12.

Figure 2A:
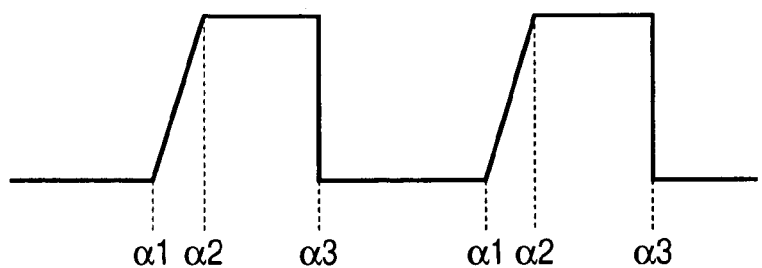
FIGS. 2A and 2B are wave pattern views of the driving pulse applied to a piezoelectric element.
Figure 2B:
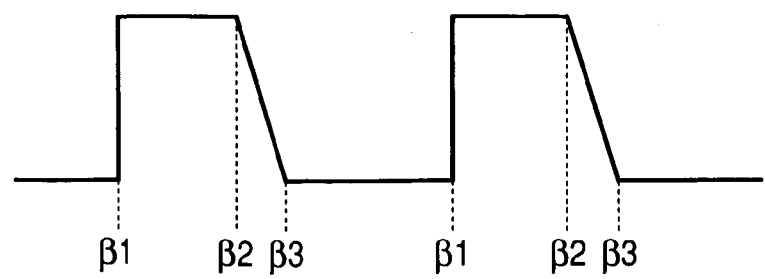

A driving-pulse supplying device (not shown) is electrically connected to the above-described piezoelectric element 12 to apply a voltage, the wave pattern of which is shown in FIG. 2A and FIG. 2B.

FIG. 2A and FIG. 2B show one example of a pulse wave pattern applied to the piezoelectric element 12. FIG. 2A shows a pulse wave pattern when the driven member 16 of FIG. 1 is moved to the left as given by the arrow, and FIG. 2B shows a pulse wave pattern when the driven member 16 of FIG. 1 is moved to the right as given by the arrow.

As shown in FIG. 2A, a substantially serrate driving pulse rising gradually from a time $\alpha 1$ to a time $\alpha 2$ and falling abruptly at a time $\alpha 3$ is applied to the piezoelectric element 12. Therefore, from the $\alpha 1$ to the time $\alpha 2$, the piezoelectric element 12 is gradually elongated. Since a driving shaft 34 moves gradually, a driven member 16 moves together with a driving shaft 14. Thereby, the driven member 16 is allowed to move to the left as shown in FIG. 1. Since the piezoelectric element 12 is abruptly contracted at the time α3, the driving shaft 14 moves to the right as shown in FIG. 1. In this case, an abrupt movement of the driving shaft 14 allows the driving shaft 14 alone to move, while the driven member 16 is kept halted at the position due to inertia. Since the driven member 16 given in FIG. 1 repeats the movement and the halt to the left by a repeated application of the serrate driving pulse shown in FIG. 2A, it is allowed to move to the left.

Figure 13:
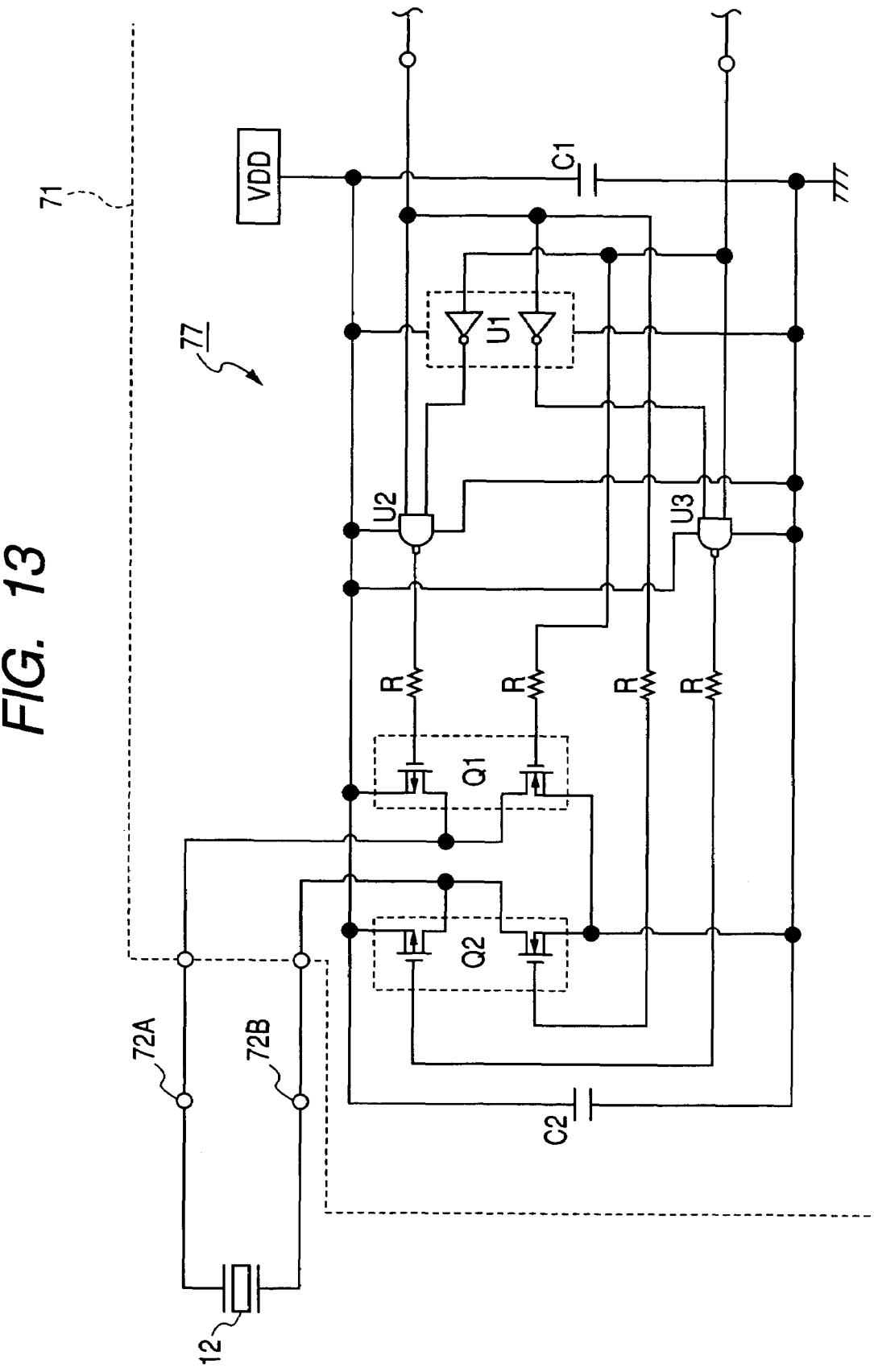
FIG. 13 is a circuit diagram showing a driving circuit of the driving mechanism according to the fourth embodiment.

As shown in FIG. 2B, a substantially serrate driving pulse rising abruptly at a time β1 and falling gradually from a time β2 to a time β3 is applied to the piezoelectric element 12. Therefore, at the time β1 the piezoelectric element 12 is abruptly elongated, and the driving shaft 14 moves to the left as shown in FIG. 1. In this case, an abrupt movement of the driving shaft 14 allows the driving shaft 14 alone to move, while the driven member 16 is kept halted at the position due to inertia. From the time β2 to the time β3, the piezoelectric element 12 is gradually contracted. At this moment, since the driving shaft 14 is gradually displaced, the driven member 16 moves together with the driving shaft 14. Thereby the driven member 16 is allowed to move to the right as shown in FIG. 1. Since the driven member 16 of FIG. 1 repeatedly moves to the right and halts by repeated application of the serrate driving pulse shown in FIG. 2B, it is allowed to move to the right. Further, the above-described serrate driving pulse is used as an example for explanation, and in a reality, a circuit as shown in FIG. 13 is used to input and output signals shown in FIGS. 14A and 14B and FIGS. 15A and 15B. The output signal is equivalent to the serrate driving pulse. Further, it is preferable to use a driving frequency in a range of 20 to 200 kHz, if selected in consideration that an audible frequency region where the driving frequency is recognized as abnormal noise is avoided and that an electric consumption is small. It is more preferable to use the driving frequency in a range of 50 to 100 kHz.

In an actuator 10, a weight member 18 bonded to the end surface 12B of a piezoelectric element 12 is made of a flexible material whose Young's modulus is small. This type of the weight member 18 is used to drastically reduce the resonance frequency $f_0$ of an equivalent-1 free system in which the piezoelectric element 12 and a driving shaft 14 are given as a mass and the weight member 18 is given as an elastic body. In other words, the weight member 18 functions as a resonance frequency-reducing member for reducing the resonance frequency. Further, the actuator 10 is lower in resonance frequency than a case where the weight member 18 made of a flexible material having a small Young's modulus is used to provide a weight member made of a rigid material. This fact is apparent from the following formula (1) for determining the resonance frequency $f_0$. In the formula (1), E denotes Young's modulus of the weight member 18; A, range on the side of the piezoelectric element 12 of the weight member 18; h, thickness of the weight member 18; Ma, mass of the piezoelectric element 12; Mb, mass of the driving member 14, and Mc, mass of the weight member 18.

[Formula 1]

$$f_0 = \frac{1}{2\pi} \sqrt{\frac{EA}{\left(Ma + Mb + \frac{1}{3}Mc\right)h}} \quad (1)$$

As apparent from the formula (1), when the Young's modulus E of the weight member 18 is made small, the resonance frequency $f_0$ in the equivalent-1 free system is also made small. In the present embodiment, the Young's modulus of the weight member 18 is made to be 1 Gpa or lower, thereby making it possible to reduce the resonance frequency $f_0$ to approximately 70 kHz or lower. Further, in the present embodiment, when the Young's modulus of the weight member 18 is made to be 300 Mpa or lower, the resonance frequency $f_0$ is made to be 35 kHz or lower. In addition, in the present embodiment, where the weight member 18 is used which is prepared by mixing tungsten powders with urethane rubber whose Young's modulus is approximately 60 Mpa, the resonance frequency $f_0$ is approximately 15 kHz. (The calculation examples are shown in FIG. 3. Refer to the number 1 in FIG. 3. For example, E+07 in FIG. 3 means ×10$^7$.)

In contrast, where a member corresponding to the weight is made of a rigid material having a greater Young's modulus, the resonance frequency $f_0$ is made greater. For example, in the present embodiment, where a material of the weight member 18 is stainless steel whose Young's modulus is in a range of 200 to 400 Gpa, the resonance frequency $f_0$ is 1 GHz or greater. Further, even where aluminum whose Young's modulus is relatively small among metals (Young's modulus is approximately 120 GPa), the resonance frequency $f_0$ is approximately 700 kHz. (Refer to the number 5 in FIG. 3.)

As described previously, in the actuator 10 of the present embodiment, since a weight member 18 is formed by a resonance frequency-reducing member, it is possible to drastically reduce the resonance frequency $f_0$ of the equivalent-1 free system. Further, where the weight member 18 is made of an elastic body or viscoelastic material, a similar effect can be obtained.

In general, in order to prevent the transmission of vibration from vibrating machinery or buildings to the supporting foundation or the floor, it is better that they are smaller in vibration transmissibility. In the equivalent-1 free system, the vibration transmissibility is expressed by the following formula (2).

[Formula 2]

$$\lambda = \sqrt{\frac{1 + \left(2\varsigma \frac{f}{f_0}\right)^2}{\left(1 + \left(\frac{f}{f_0}\right)^2\right)^2 + \left(2\varsigma \frac{f}{f_0}\right)^2}} \quad (2)$$

In the formula (2), λ denotes vibration transmissibility of the equivalent-1 free system; f, driving frequency to be used; $f_0$, resonance frequency of the equivalent-1 free system; and ξ, damping ratio of the equivalent-1 free system.

Next, when the vibration transmissibility λ is 1 or lower in the equivalent-1 free system, it is supposed that mechanical vibration is not likely to be transmitted to the foundation or the floor, irrespective of any value of ξ.

Figure 4:
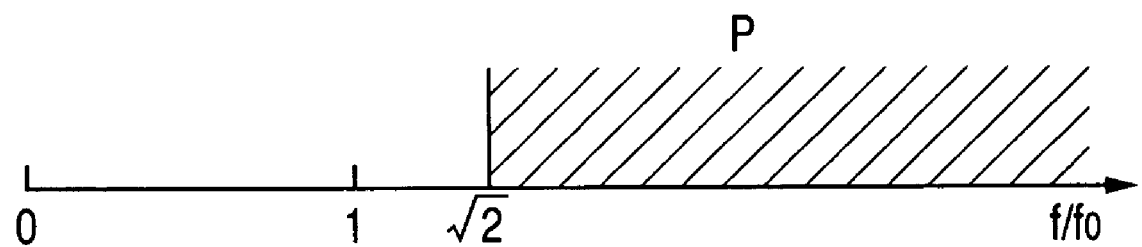
FIG. 4 is a drawing showing the scope of resonance frequency.

Therefore, as shown in the formula (3) and the formula (4), which is a modification of the formula (3), when the vibration transmissibility λ is in a range of 1 or lower or in a range satisfying $f \geq 2^{1/2} \cdot f_0$ (range P in FIG. 4), vibration of the piezoelectric element 12 is not likely to be transmitted to a support member of the actuator 10 (for example, fixed frame 24 in FIG. 1). This range is a vibration-isolating range where the effect of resonance is quite small. Therefore, a combination of frequencies, which is an optimal embodiment for carrying out the invention, namely, the resonance frequency of the actuator is 70 kHz or lower and the driving frequency is in a range of 50 to 100 kHz, is able to satisfy the vibration-isolating range. The vibration-isolating range is described, for example, in "Introduction of Mode Analysis" authored by Akio Nagamatsu, published by Corona Publishing Co., Ltd. For reference's sake, the relationship of $f \geq 2^{1/2} \cdot f_0$ is applicable to other embodiments.

[Formula 3]

$$1 \geq \lambda = \sqrt{\frac{1 + \left(2\varsigma \frac{f}{f_0}\right)^2}{\left(1 + \left(\frac{f}{f_0}\right)^2\right)^2 + \left(2\varsigma \frac{f}{f_0}\right)^2}} \quad (3)$$

[Formula 4]

$$f \geq 2^{1/2} \cdot f_0 \quad (4)$$

The thus constituted actuator 10 is attached to a fixed frame 24 (body) via a support member 22. The support member 22 is formed in a plate shape by use of a metal or a resin, and a circular hole 22A through which a driving shaft 14 is to pass is formed at the center. The support member 22 is adhered to an end surface 12A of the piezoelectric element 12 by an adhesive agent 26 in a state that the driving shaft 14 is inserted through the hole 22A and also in contact with the end surface 12A of the piezoelectric element 12. Further, the support member 22 is firmly adhered and fixed by an adhesive agent 28 in a state that it is in contact with a step portion 24B of the fixed frame 24. Thereby, the actuator 10 constituted by the piezoelectric element 12, the driving shaft 14 and the weight member 18 is supported by the fixed frame 24 on the end surface 12A of the piezoelectric element 12. Further, an elastic adhesive agent is preferably used as the adhesive agents 26 and 28.

The fixed frame 24 is a member attached to a body of a cellular phone (not shown) and the like and provided with two through holes 24A and 24A. The through holes 24A and 24A are formed in a diameter slightly larger than that of a driving shaft 14. The driving shaft 14 is slidably supported in the arrow direction by being inserted through the through holes 24A and 24A.

A protective plate 30 is attached to an end of the fixed frame 24. The protective plate 30 is formed approximately in a U shape by bending a thin plate and attached to a fixed frame 24 not in contact with the weight member 18. Since the protective plate 30 is attached to reinforce the actuator 10, it is possible to prevent damage on falling. Further, in the present embodiment, the protective plate 30 is attached not in contact with the weight member 18. It may also be attached in contact with the weight member 18.

As described above, in the driving mechanism according to the first embodiment where an actuator 10 is supported on the end surface 12A of the piezoelectric element 12, the actuator 10 is supported in an approximately ideal state that the actuator 10 is suspended in air. Therefore, vibration is not likely to be transmitted between the actuator 10 and the fixed frame 24, thereby reducing the effect of resonance to move a driven member 16 correctly.

Figure 27A:
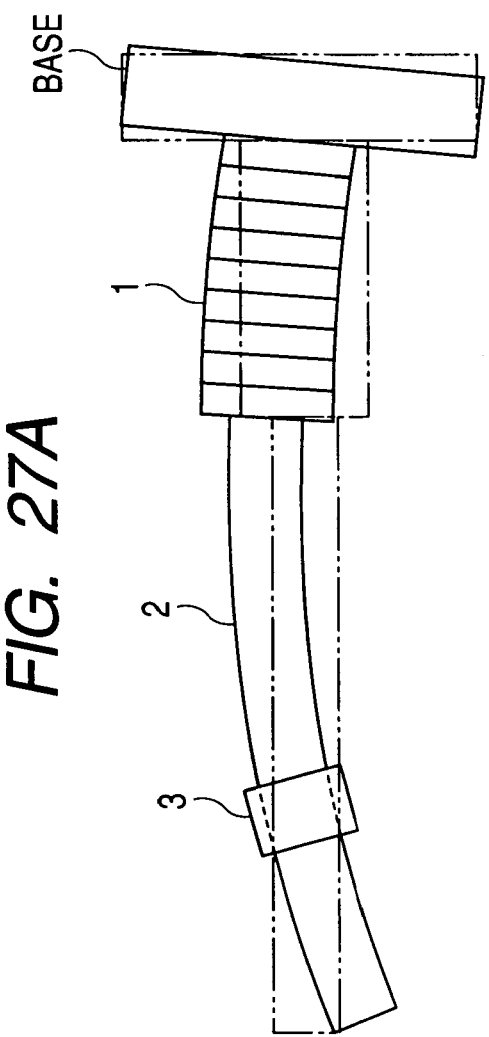
FIGS. 27A and 27B are views for explaining defects of the related-art actuator.
Figure 27B:
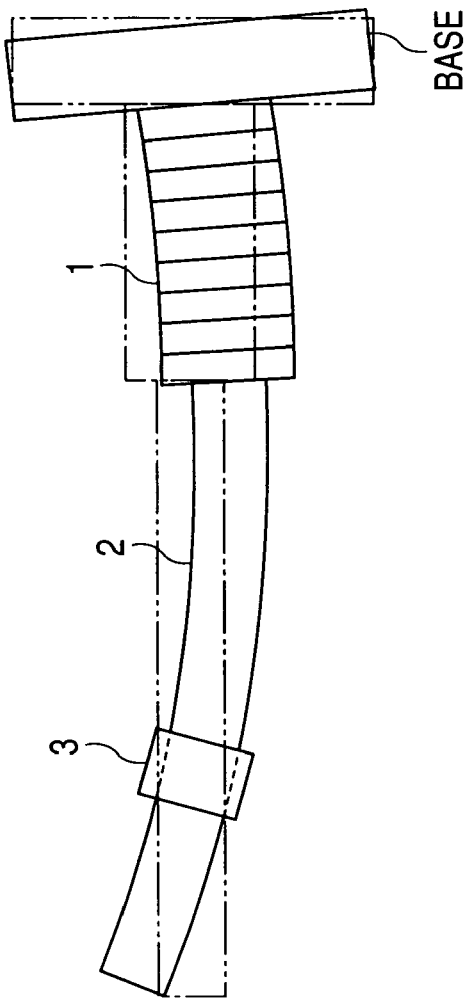

In particular, in the above-described first embodiment where a flexible material is used as the weight member 18, it is possible to suppress resonance resulting from the actuator 10 in itself. Further, as described above, the actuator 10 is supported to suppress more effectively the resonance occurring between the actuator 10 and the fixed frame 24. In other words, where the weight member 18 made of a flexible material is used, a system constituted by the piezoelectric element 12, the driving shaft 14 and the weight member 18 is lower in resonance frequency. More specifically, it is possible to drastically reduce the resonance frequency $f_0$ of the equivalent-1 free system in which the piezoelectric element 12 and the driving shaft 14 are given as a mass and the weight member 18 is given as an elastic body. Since the resonance frequency $f_0$ is made lower, the driving frequency f is more easily established in the vibration-isolating range which gives $f \geq 2^{1/2} \cdot f_0$, thereby reducing the effect of resonance. Therefore, as shown in FIG. 27A and FIG. 27B, it is possible to prevent vibration other than that in the elongating and contracting direction of the piezoelectric element 12 generated in a case where the weight member 18 is made of a rigid material. Since the driving shaft 14 is thereby displaced to the elongating and contracting direction of the piezoelectric element 12, a driving force derived from the elongation and contraction of the piezoelectric element 12 is accurately transmitted to a driven member 16. Next, the driven member 16 can be accurately driven and controlled in the elongating and contracting direction of the piezoelectric element 12. Further, since the resonance frequency $f_0$ is lower, a constitutional variation in the piezoelectric element 12, the driving shaft 14 and the weight member 18 is well controlled to provide a stable driving force.

Further, the vibration-isolating range is a range where the vibration transmissibility from the actuator 10 to the fixed frame 24 is 1 or lower. Where the relationship of $f \geq 2^{1/2} \cdot f_0$ is also established, it is possible to suppress the effect of resonance because the vibration transmissibility is 1 or lower.

As described above, since the weight member 18 made of a flexible material is used to suppress the resonance inside the actuator 10, the actuator 10 is supported on the end surface 12A of the piezoelectric element 12. Thereby, the actuator 10 is driven in an ideal state free from resonance to move the driven member 16 more accurately.

Figure 5:
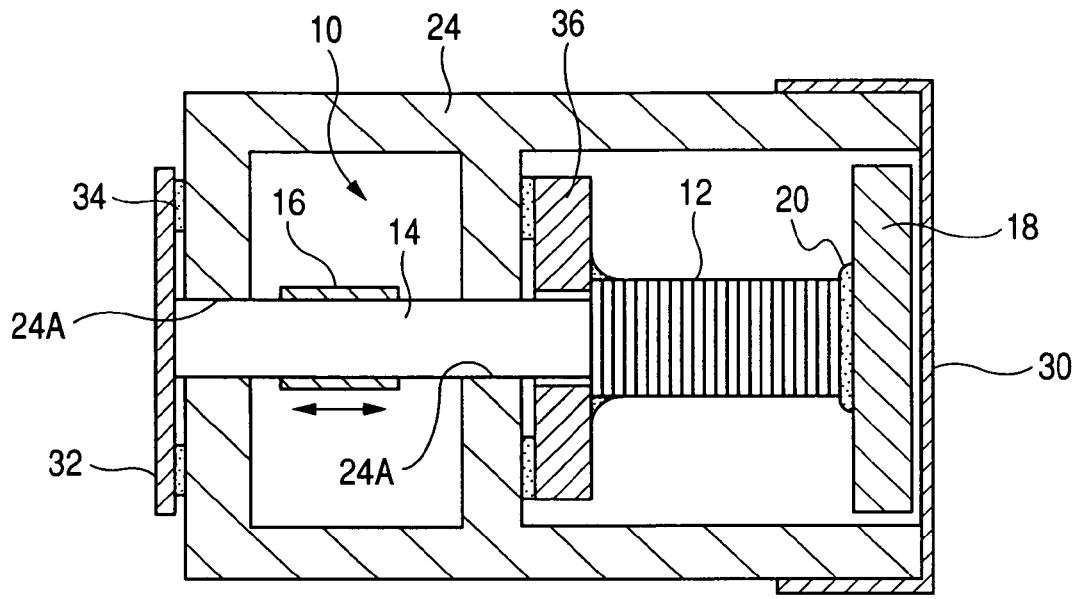
FIG. 5 is a sectional view showing a modification of the driving mechanism in FIG. 1.

In the above-described first embodiment, the support member 22 made of a rigid material is used to connect the piezoelectric element 12 with the fixed frame 24. However, the present invention is not limited thereto. As shown in FIG. 5, the end surface 12A of the piezoelectric element 12 and the fixed frame 24 may be supported by use of a support member 36 made of an elastic body such as rubber. The support member 36 is formed in a cylindrical shape, and bonded to the end surface 12A of the piezoelectric element 12 and the fixed frame 24 in a state that the driving shaft 14 is inserted. The elastic support member 36 effectively suppresses vibration from transmitting between the fixed frame 24 and the actuator 10. It is also possible to prevent vibration from transmitting to the actuator 10 from the outside, in particular.

A protective plate 32 is attached to the fixed frame 24 shown in FIG. 5. The protective plate 32 is formed in a plate shape and attached to the fixed frame 24 by use of a double-sided adhesive tape 34 in contact with the leading end surface of the driving shaft 14. Since the protective plate 32 is attached to reinforce the actuator 10, it is possible to prevent damage on falling. Further, in the present embodiment, the protective plate 32 is attached in contact with the driving shaft 14. The protective plate 32 may also be attached not in contact with the driving shaft 14.

Figure 6:
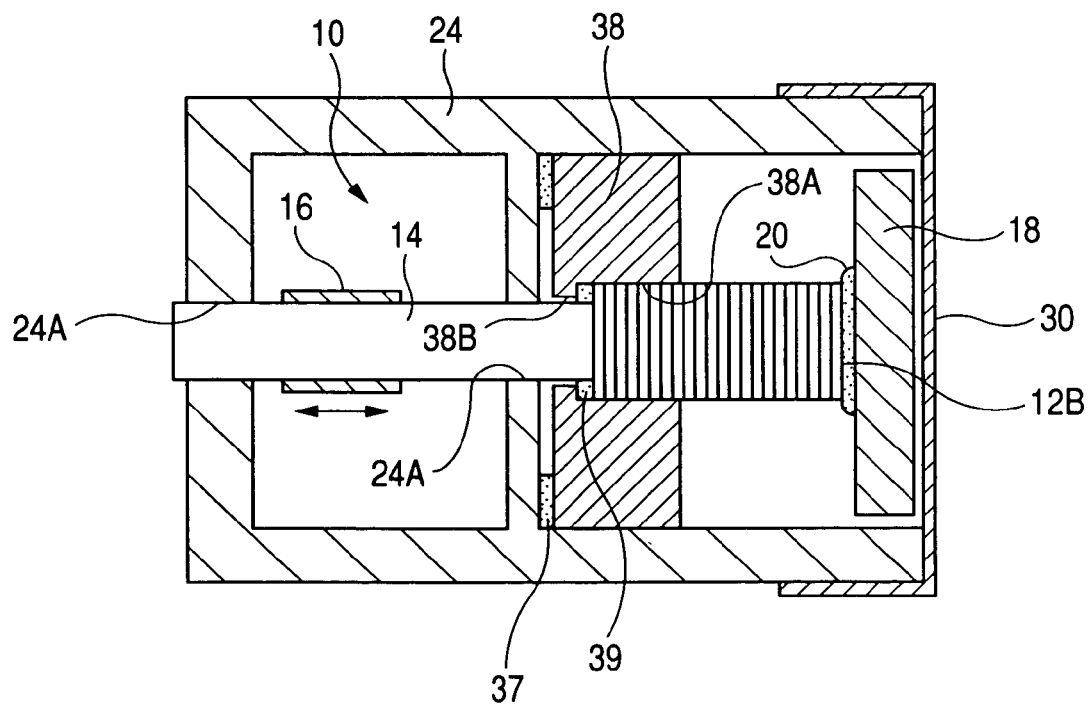
FIG. 6 is a sectional view showing a modification of the driving mechanism in FIG. 1.

As shown in FIG. 6, a support member 38 may be used to support the actuator 10 to the fixed frame 24. The support member 38 is made of an elastic member such as silicon rubber and provided with a rectangular hole 38A into which the piezoelectric element 12 is press-fitted and a circular hole 38B into which the driving shaft 14 is loosely inserted. Next, the support member 38 is bonded to the end surface 14A of the piezoelectric element 14 by use of an elastic adhesive agent 39 in a state that the piezoelectric element 14 is press-fitted into the hole 38A and also the driving shaft 14 is inserted into the hole 38B.

Further, an outer configuration of the support member 38 is formed in the same shape with an inner configuration of the fixed frame 24 in such a way that a support member 38 can be press-fitted inside a fixed frame 24. The support member 38 is adhered to the fixed frame 24 by use of an elastic adhesive agent 37 in a state that it is press-fitted inside the fixed frame 24.

In the thus constituted driving mechanism, since a piezoelectric element 14 is press-fitted into a support member 38, and the support member 38 is also press-fitted into a fixed frame 24, the side surface of the piezoelectric element 14 is supported by means of a support member. Therefore, when the driving mechanism is impacted on falling and the like, the support member 38 is able to absorb the impact, thereby improving the impact resistance.

Second Embodiment

Figure 7:
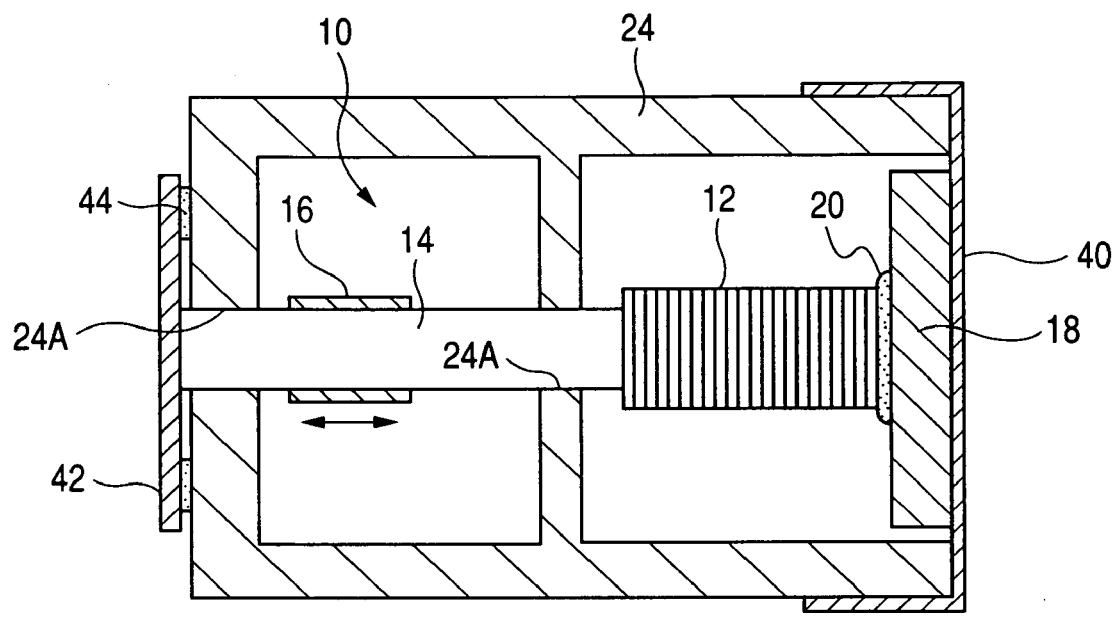
FIG. 7 is a sectional view showing the driving mechanism according to a second embodiment.

Next, a description is given for a driving mechanism according to a second embodiment of the present invention with reference to FIG. 7.

As shown in FIG. 7, in the second embodiment, an actuator 10 is supported in such a state being pressed by a pair of support plates 40 and 42 on both sides of the piezoelectric element 12 in the elongating and contracting direction. The support plate 40 is formed in a U shape by use of a thin metal plate, and attached to the fixed frame 24 in a state of pressing the weight member 18. The support plate 42 is formed by a thin metal plate and bonded to the fixed frame 24 by an adhesive agent 44 in a state suppressing the leading end surface of the driving shaft 14.

In the above-described second embodiment, the actuator 10 is held between a pair of the support plates 40 and 42 in the elongating and contracting direction of the piezoelectric element 12, or in a state that it is almost suspended in air. Since the actuator 10 supported in the above state is free from a part bonded to the fixed frame 24, vibration is not likely to be transmitted between the actuator 10 and the fixed frame 24 and resonance is not likely to be generated between the actuator 10 and the fixed frame 24. The actuator 10 of the second embodiment is supported in such a manner as to reduce the effect by resonance, thus making it possible to correctly move the driven member 16. In particular, where the weight member 18 is made of a flexible material, as described above, resonance is not likely to be generated inside the actuator 10. Therefore, the actuator 10 is pressed from the both sides, thereby being maintained in a state free from resonance.

Third Embodiment

Figure 8:
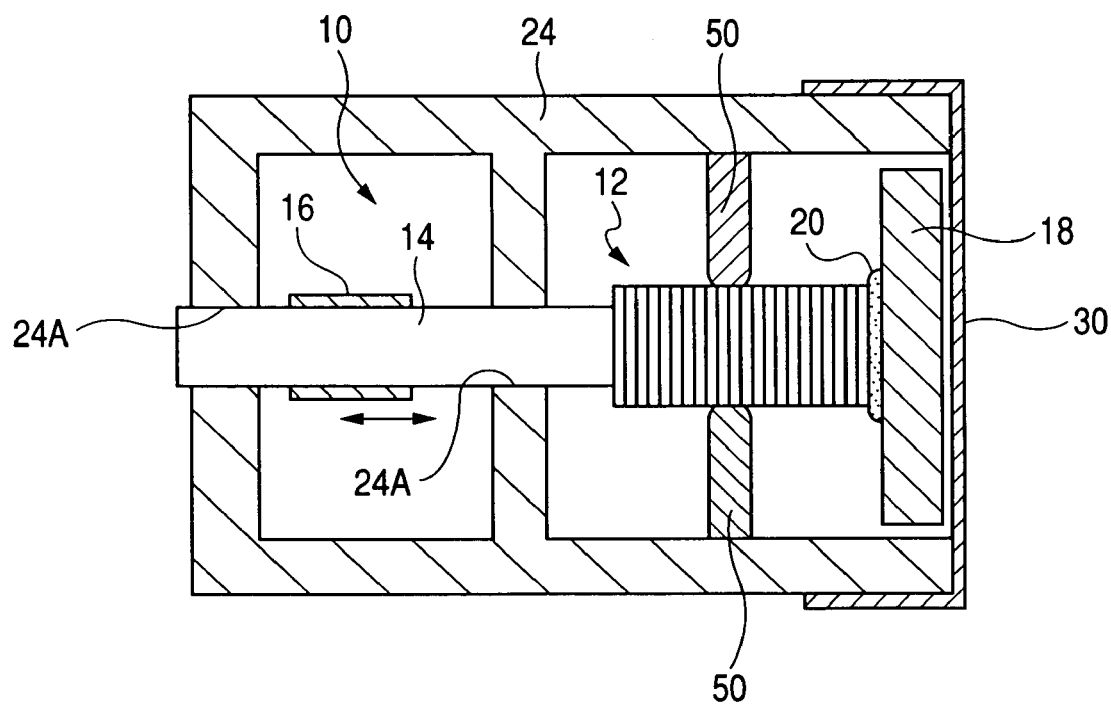
FIG. 8 is a sectional view showing the driving mechanism according to a third embodiment.

Next, a description is given for a driving mechanism according to a third embodiment of the present invention with reference to FIG. 8.

As shown in FIG. 8, the actuator 10 of the third embodiment is supported in such a state that the piezoelectric element 12 is pressed laterally from both sides by a pair of support members 50 and 50. These support members 50 and 50 are made of a material such as metal, resin or rubber and attached to a fixed frame 24. Further, the leading end of the support members 50 and 50 may be adhered to the side surfaces of the piezoelectric element 12 by an elastic adhesive agent. In place of a pair of the support members 50 and 50, a cylindrical support member may be used to support the side surfaces of the piezoelectric element 12 so as to suppress all along the circumference.

According to the third embodiment constituted as described above, the piezoelectric element 12 is pressed from both sides by a pair of the support members 50 and 50 so as to support the actuator 10. Therefore, the actuator 10 is supported in an approximately ideal state that it is suspended in air. Since vibration is not likely to be transmitted between the actuator 10 and the fixed frame 24, the actuator 10 is less influenced by resonance to accurately move the driven member 16. As described above, in particular where the weight member 18 is made of a flexible material, resonance is not likely to generate inside the actuator 10, and the side of the piezoelectric element 12 is supported by being suppressed from both sides, thereby making it possible to keep the actuator 10 free from resonance.

In the first to the third embodiments described above, the weight member 18 made of a flexible material is used. However, the present invention is not limited thereto, and a weight member made of a rigid material may be used. Also, in this case, as described above, the actuator 10 is supported, thereby making it possible to reduce the effect of resonance and to accurately move the driven member 16.

Further, the actuator 10 of the present invention may be used in small precision instruments, for example, a digital camera and a cellular phone. In particular, when the actuator 10 of the present invention is used in a cellular phone which must be driven at a low voltage of 3V or lower, the cellular phone is allowed to be driven at a high frequency of approximately 20 kHz, thereby making it possible to move a driven member 16 at a high speed of 2 mm/s or greater. Thereby, a zoom lens which must be moved in a distance of approximately 10 mm is allowed to move quickly. Further, the actuator 10 of the present invention is not limited to an application in which zoom lenses such as a focus lens and a zoom lens are moved, but may be used in an application in which a CCD is moved.

Fourth Embodiment

Next, a description is given for a driving mechanism according to a fourth embodiment of the present invention.

Figure 9:
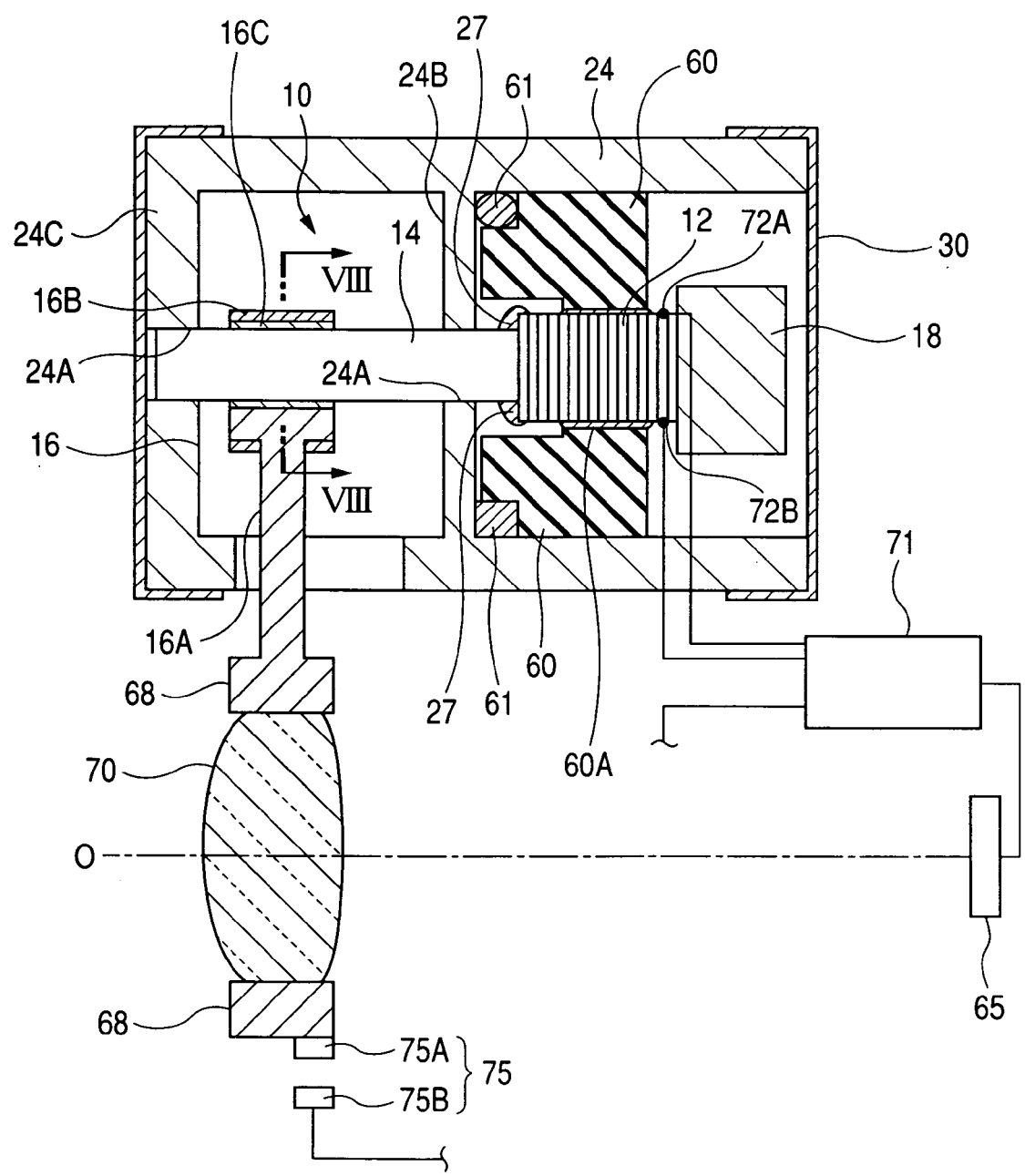
FIG. 9 is a sectional view showing the driving mechanism according to a fourth embodiment.

FIG. 9 is a sectional view showing the driving mechanism according to the fourth embodiment of the present invention.

As shown in FIG. 9, the driving mechanism according to the present embodiment is to move a zoom lens 70 and to drive the zoom lens 70. It is provided with a piezoelectric element 12, an actuator 10 having a driving shaft 14 and a driven member 16, and a support member 60 for supporting the actuator 10. The piezoelectric element 12 is an electromechanical conversion element which can be elongated and contracted by inputting electric signals and also elongated and contracted in a predetermined direction. The piezoelectric element 12 is connected to a controller 71 so as to elongate and contract when electric signals are input by the controller 71. The piezoelectric element 12 is provided, for example, with two input terminals 72A and 72B. Voltages applied to the input terminals 72A and 72B are repeatedly increased and decreased, thereby allowing the piezoelectric element 12 to elongate and contract repeatedly.

A driving shaft 14 is attached to the piezoelectric element 12, with the longitudinal direction oriented to the elongating and contracting direction of the piezoelectric element 12. For example, the one end of the driving shaft 14 is in contact with the piezoelectric element 12 and adhered thereto via an adhesive agent 27. The driving shaft 14 is a long member, for example, a cylindrical-shaped member is used. The driving shaft 14 is supported by partition portions 24B and 24C extending inside from a fixed frame 24 so as to move along the longitudinal direction. The partition portions 24B and 24C are members for partitioning the movement range of a driven member 16, and also function as a support member of the driving shaft 14. The fixed frame 24 functions as a case for accommodating the actuator 10.

Through holes 24A through which the driving shaft 14 is inserted are formed, respectively, at the partition portion 24B and the partition portion 24C. The partition portion 24B supports the vicinity of an area for attaching the piezoelectric element 12 of the driving shaft 14, namely, a base end range of the driving shaft 14. The partition portion 24C supports a leading end range of the driving shaft 14. The fixed frame 24 functions as a frame body or a frame member for assembling the actuator 10. The driving shaft 14 is attached to the piezoelectric element 12 to reciprocate along the longitudinal direction in accordance with the repeated movement of elongation and contraction of the piezoelectric element 12.

Further, FIG. 9 shows a case where the driving shaft 14 is supported at two ranges, namely on the leading end side and the base end side by the partition portions 24B and 24C. There is also a case where the driving shaft 14 is supported either only on the leading end side or on the base end side. For example, a through hole 24A of the partition portion 24B is formed larger than an outer diameter of the driving shaft 14, by which the driving shaft 14 is supported by the partition portion 24C only at the leading end range. Further, the through hole 24A of the partition portion 24C is formed larger than an outer diameter of the driving shaft 14, by which the driving shaft 14 is supported by the partition portion 24B only at the base end range.

In addition, FIG. 9 shows a case where the partition portions 24B and 24C supporting the driving shaft 14 are integrally formed with a fixed frame 24. These partition portions 24B and 24C may be provided by attaching to a member separated from the fixed frame 24. Even in the case of the separated member, functions and effects similar to the case of the integrated member can be obtained.

A driven member 16 is movably attached to a driving shaft 14. The driven member 16 is attached to the driving shaft 14 through frictional engagement and allowed to move along the longitudinal direction. For example, the driven member 16 is engaged to the driving shaft 14 at a predetermined friction coefficient. The driven member 16 is pressed to the driving shaft 14 at a predetermined pressing force, thereby causing a certain frictional force during movement. Since a movement force exceeding the frictional force is applied to the driven member 16, this allows the driven member 16 to move along the driving shaft 14 against the frictional force.

The actuator 10 is supported by a fixed frame 24 by means of a support member 60. The support member 60 supports laterally the actuator 10 in the elongating and contracting direction of the piezoelectric element 12, and disposed between the fixed frame 24 for accommodating the actuator 10 and the piezoelectric element 12. In this case, it is preferable to support the actuator 10 in a direction orthogonal to the elongating and contracting direction of the piezoelectric element 12. The support member 60 functions as an attachment member for supporting laterally the actuator 10.

The support member 60 is formed by an elastic body having elasticity greater than a predetermined level, such as a silicone resin. The support member 60 is provided with an insertion hole 60A for inserting the piezoelectric element 12 and assembled to the fixed frame 24 in such a state that the piezoelectric element 12 is inserted into the insertion hole 60A. The support member 60 is bonded to the fixed frame 24 via an adhesive agent 61. Further, the support member 60 is bonded to the piezoelectric element 12 via an adhesive agent. The support member 60 is made of an elastic body, thereby making it possible to support the actuator 10 so as to move in the elongating and contracting direction of the piezoelectric element 12. FIG. 9 shows two support members 60, namely, on both sides of the piezoelectric element 12. These two support members 60 and 60 are shown because they are viewed from the cross section of one continuous support member 60.

Further, the support member 60 may be bonded to the fixed frame 24 and to the piezoelectric element 12 by a pressing force of the support member 60 being press-fitted to a space between the fixed frame 24 and the piezoelectric element 12 to press. For example, the support member 60 is constituted by an elastic body and formed to be larger than a space between the fixed frame 24 and the piezoelectric element 12, into which the support member 60 is press-fitted. Thereby, the support member 60 is closely attached to the fixed frame 24 and the piezoelectric element 12. In this case, the piezoelectric element 12 is pressed by the support member 60 from both sides in a direction orthogonal to the elongating and contracting direction, thereby supporting the actuator 10.

In this case, a description was given for a case where the support member 60 is made of a silicone resin. The support member 60 may be constituted by a spring member. For example, a spring member is disposed between the fixed frame 24 and the piezoelectric element 12, thereby supporting the actuator 10 to the fixed frame 24.

A zoom lens 70 is attached via a lens frame 68 to the driven member 16. The zoom lens 70 constitutes a photographic optical system of a camera and is to be moved by a driving mechanism. The zoom lens 70 is integrally coupled to the driven member 16 and provided so as to move together with the driven member 16. A fixed lens (not shown) is disposed on an optical axis O of the zoom lens 70 to constitute the photographic optical system of the camera. Further, an imaging device 65 is placed on the optical axis O. The imaging device 65 is an imaging section for converting an image formed by a photographic optical system to electric signals, and, for example, constituted by a CCD. The imaging device 65 is connected to a controller 71 to output image signals to the controller 71.

A weight member 18 is attached to the end of the piezoelectric element 12. The weight member 18 is a member for transmitting an elongating and contracting force of the piezoelectric element 12 to a driving shaft 14 and attached to the end of the opposing side of the end of the piezoelectric element 12 at which the driving shaft 14 is attached. A material which is heavier than the driving member 14 is used as the weight member 18. Further, it is preferable to use a material which is prepared by mixing metal powders with an elastically deformable member as the weight member 18. Mixture of metal powders increases the weight, and use of an elastically deformable member makes it possible to attenuate unnecessary resonance in driving the piezoelectric element 12.

Further, when the weight member 18 is constituted by a soft member, the resonance frequency of the actuator 10 is sufficiently made small as compared with the driving frequency of the piezoelectric element 12, thereby reducing the effect of resonance.

In addition, the weight member 18 is provided in a state that it is not supported and fixed to a fixed frame 24. More specifically, the weight member 18 is not directly supported or fixed to the fixed frame 24. In other words, the weight member 18 is provided in a state that it is not supported or fixed to the fixed frame 24 so as not to be limited in movement.

A driving mechanism is provided with a detector 75 for detecting the movement position of a driven member 16. The detector 75 includes, for example, optical detectors such as a photo reflector and photo interrupter. More specifically, where the detector 75 provided with a reflector 75A and a detecting portion 75B is used, the reflector 75A is attached to a lens frame 68 which is integrally formed with the driven member 16 to emit a detection light from the detecting portion 75B to the reflector 75A, and the light reflected on the reflector 75A is detected at the detecting portion 75B, thereby detecting movement positions of the driven member 16 and the zoom lens 70.

The detector 75 is connected to a controller 71. Output signals of the detector 75 are input into the controller 71. The controller 71 performs control of the entire of a driving mechanism, and constituted by, for example, a CPU, a ROM, a RAM, an input signal circuit and an output signal circuit. Further, the controller 71 is provided with a driving circuit for driving the piezoelectric element 12, and outputting electric signals for driving the piezoelectric element 12.

Figure 10:
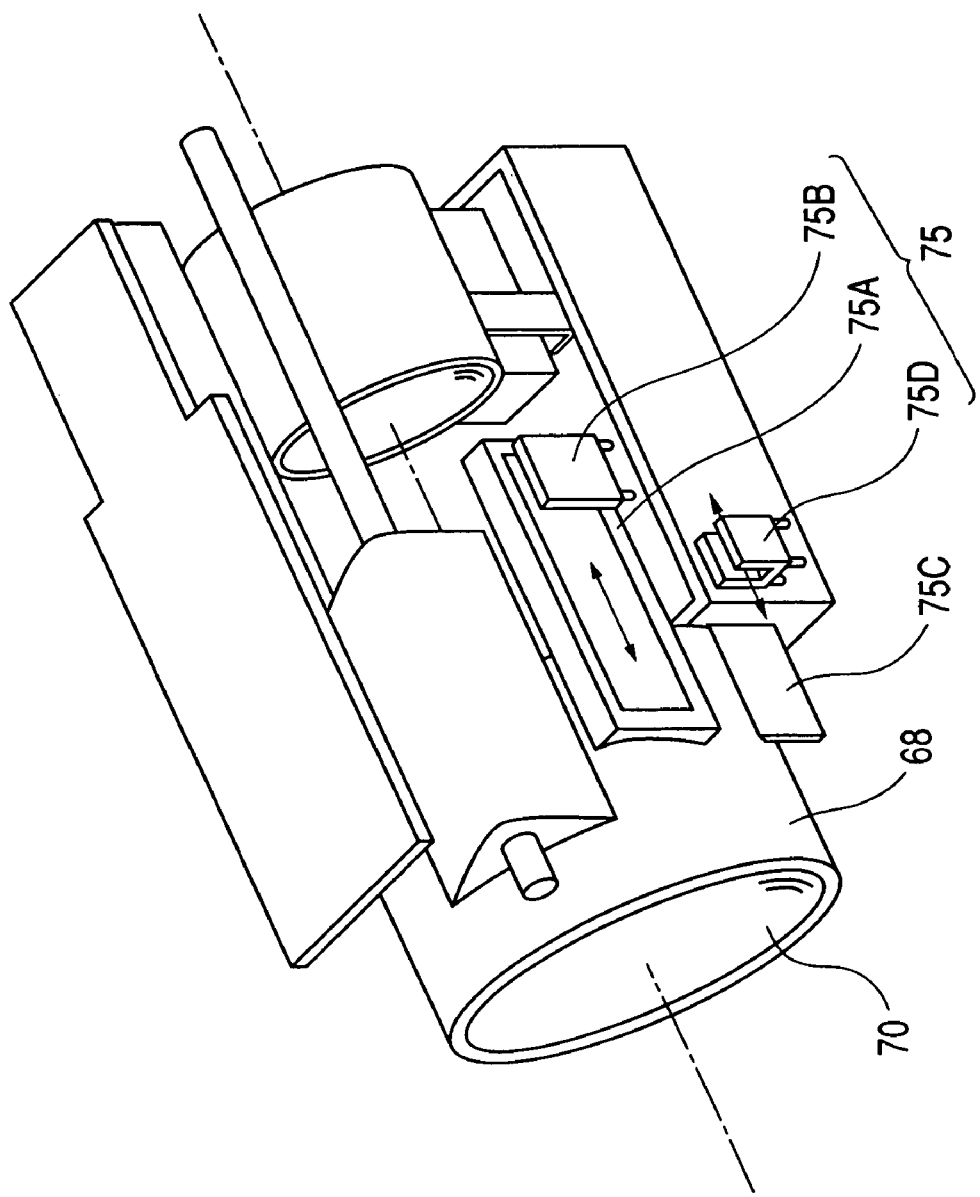
FIG. 10 is a perspective view showing a positional detector of the driving mechanism in the fourth embodiment.
Figure 11:
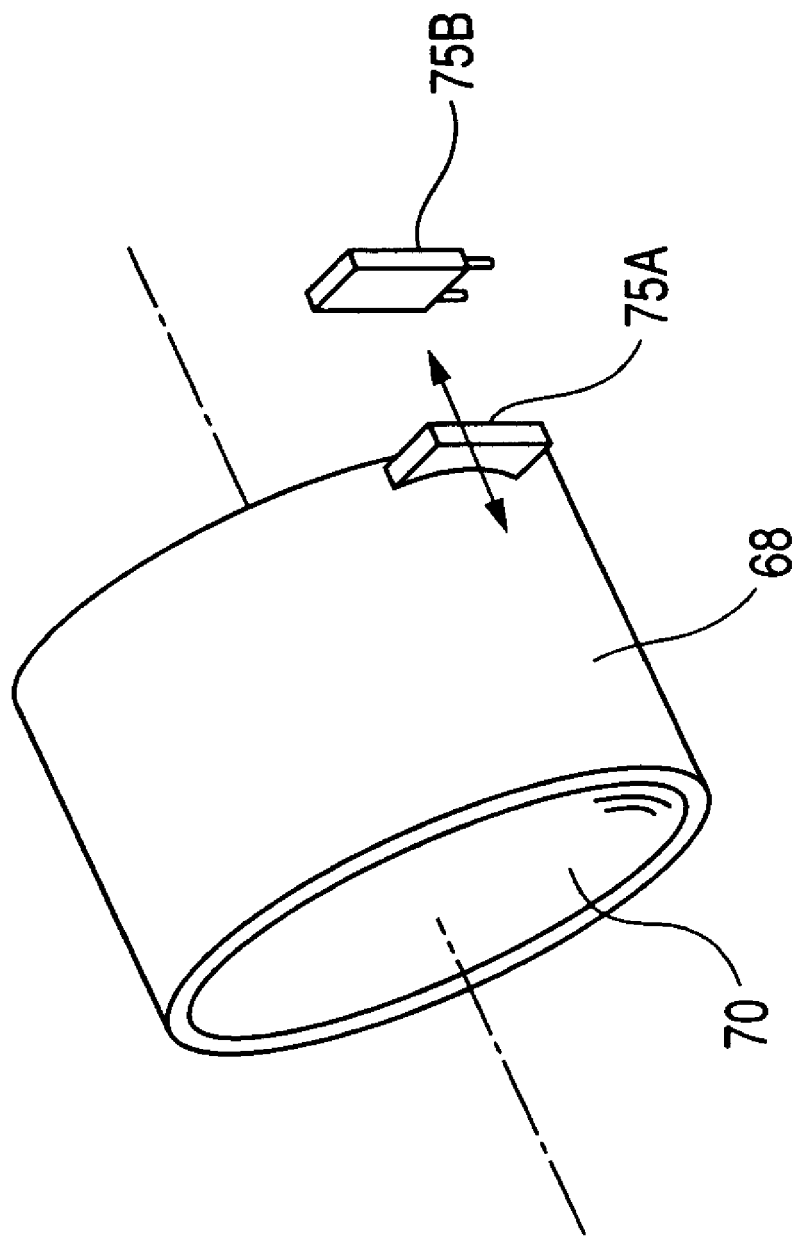
FIG. 11 is a view showing a modification of the positional detector of the driving mechanism in the fourth embodiment.

FIG. 10 and FIG. 11 are drawings showing an example of the detector used in the driving mechanism according to the present embodiment.

As shown in FIG. 10, the detector 75 is provided, for example, with a reflector 75A, a detecting portion 75B, an interrupter 75C and a detecting portion 75D. The reflector 75A and the interrupter 75C are attached to a lens frame 68, and move together with the lens frame 68 and a zoom lens 70. At a position opposing the reflector 75A is arranged the detecting portion 75B. The detecting portion 75B detects a reflection quantity of light from the reflector 75A which changes according to the movement of the zoom lens 70, thereby detecting a movement amount of the zoom lens 70. At a position where the interrupter 75C passes is arranged a detecting portion D. The detecting portion D detects passage of the interrupter 75C and also detects passage of the zoom lens 70 at a predetermined position.

Further, as shown in FIG. 11, the reflector 75A and the detecting portion 75B may be arranged so that the reflector 75A is in access to or spaced apart from the detecting portion 75B in accordance with the movement of the zoom lens 70, and the movement position of the zoom lens 70 is detected in accordance with a relative distance between the detecting portion 75B and the reflector 75A. In this case, the position of the zoom lens 70 can be detected linearly.

In addition, the zoom lens 70 may be moved based on output signals of an imaging device 65 as a method for moving and controlling the zoom lens 70. For example, detection is made for the high frequency content of an image signal output from the imaging device 65, thereby allowing the zoom lens 70 to move at a position where the level is maximized. As described above, the zoom lens 70 is controlled for the movement, thereby removing the necessity for detecting the position by the detector 75.

Figure 12:
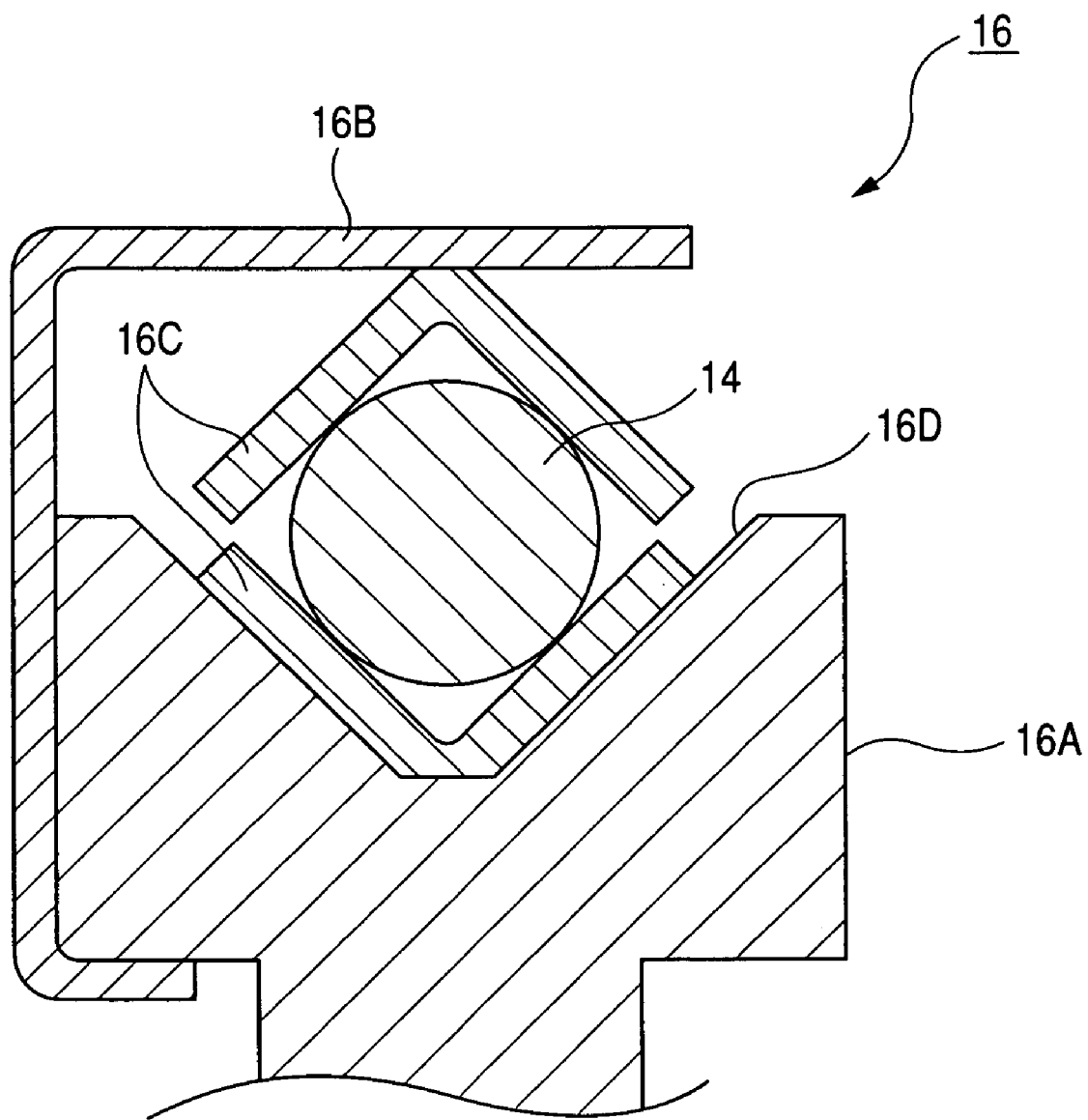
FIG. 12 is a sectional view showing a driven member of the driving mechanism according to the fourth embodiment.

FIG. 12 is a sectional view of the driven member 16 in the line of VIII to VIII in FIG. 9.

As shown in FIG. 12, the driven member 16 is constituted by, for example, a body 16A, a pressing portion 16B and a sliding portion 16C. The body 16A is pressed to a driving shaft 14 at a certain force by a pressing portion 16B. The body 16A is provided with a V-shaped groove 16D. The driving shaft 14 is accommodated inside the groove 16D so as to be held between two sliding portions 16C and 16C. The sliding portions 16C and 16C are plates, each having a V shaped-cross section and arranged so that their recessed portions are opposed to each other. They are provided behind the driving shaft 14. The driving shaft 14 is accommodated inside the V-shaped groove 16D, thereby making it possible to attach the driven member 16 to the driving shaft 14 in a stable manner.

A material, for example, a blade spring having an L-shaped cross section, is used as the pressing portion 16B. One side of the pressing portion 16B is hooked on the body 16A and the other side is placed at a position opposed to the groove 16D, by which the other side is used to hold the driving shaft 14 accommodated in the groove 16D between the body 16A and the sliding portion 16C. Thereby, the body 16A is allowed to be pressed to the driving shaft 14.

As described above, the driven member 16 is attached by pressing the body 16A to the driving shaft 14 at a certain force via the pressing portion 16B, thereby frictionally being engaged with the driving shaft 14. More specifically, the driven member 16 is attached so that the body 16A and the pressing portion 16B are pressed at a certain pressing force to the driving shaft 14 to generate a certain frictional force on movement.

Further, since the driving shaft 14 is held between the sliding portions 16C and 16C having a V-shaped cross section, the driven member 16 comes into a line contact with the driving shaft 14 at plural positions thereby making it possible to frictionally engage with the driving shaft 14 in a stable manner. In addition, since the driven member 16 is in a line contact with plural positions and frictionally engaged with the driving shaft 14, the driven member 16 is practically engaged with the driving shaft 14 in surface contact, thereby providing a stable frictional engagement.

In FIG. 12, the sliding portion 16C is constituted by a plate having a V-shaped cross section. However, the sliding portion 16C may be constituted by a plate having a circular cross section and allowed to be in surface contact with the driving shaft 14. In this case, since the driven member 16 is engaged with the driving shaft 14 in surface contact, the driven member 16 is allowed to frictionally engage with the driving shaft 14 more stably.

FIG. 13 is a circuit diagram of the driving circuit which drives the piezoelectric element 12.

As shown in FIG. 13, a driving circuit 77 is provided inside a controller 71. The driving circuit 77 functions as a drive circuit for a piezoelectric element 12 to output a driving electric signal to the piezoelectric element 12. The driving circuit 77 inputs control signals from a control signal generating portion (not shown) of the controller 71 to amplify the voltage or the current of the signal, thereby outputting the driving electric signal for the piezoelectric element 12. In the driving circuit 77, an input section is constituted, for example, by logical circuits U1 to U3, and an output section is provided with field-effect transistors (FET) Q1 and Q2. The transistors Q1 and Q2 are constituted so as to output an H output (high potential output), an L output (low potential output) and an OFF output (open output) as output signals.

Figure 15A:
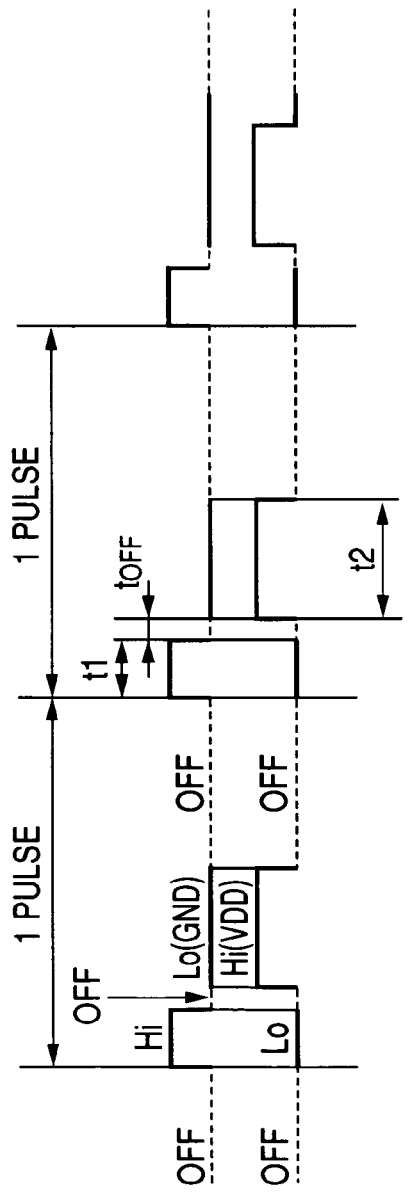
FIGS. 15A and 15B are wave pattern views of an output signal output from the driving circuit in FIG. 13.
Figure 15B:
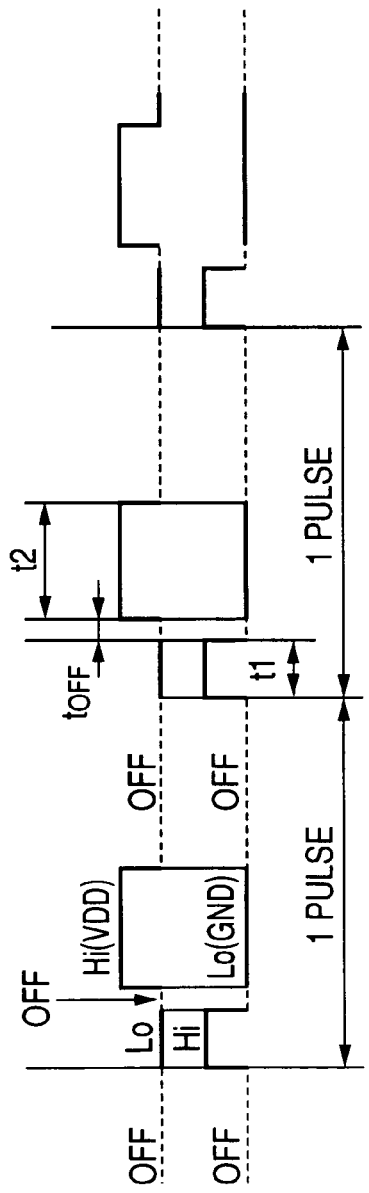

FIGS. 14A and 14B show the input signal to be input in the driving circuit 77, and FIGS. 15A and 15B show the output signal to be output from the driving circuit 77. FIG. 14A shows the input signal to be input when the driven member 16 is moved to a direction which is in access to the piezoelectric element 12 (right direction in FIG. 9). FIG. 14B is the output signal to be input when the driven member 16 is moved to a direction which is spaced apart from the piezoelectric element 12 (left direction in FIG. 9). Further, FIG. 15A is the output signal to be output when the driven member 16 is moved to a direction which is in access to the piezoelectric element 12 (right direction in FIG. 9) and FIG. 15B is the output signal to be output when the driven member 16 is moved to a direction which is spaced apart from the piezoelectric element 12 (left direction in FIG. 9).

The output signals in FIGS. 15A and 15B are pulse signals which are turned on and off in synchronization with the input signals in FIG. 14A and B. The two signals in FIGS. 15A and 15B are input to input terminals 72A and 72B of the piezoelectric element 12. As shown in FIGS. 2A and 2B, signals having the following trapezoidal wave pattern may be input into the input terminals 72A and 72B. However, rectangular pulse signals as shown in FIGS. 15A and 15B may also be input to operate the piezoelectric element 12. In this case, the rectangular pulse signals may be used for a driving signal of the piezoelectric element 12, thereby making it possible to generate signals easily.

The output signals in FIGS. 15A and 15B are constituted by two types of rectangular pulse signals to give the same frequency. Since these two pulse signals are mutually different in phase, they are signals in which the mutual difference in potential is made great in a stepwise manner and next made small abruptly or the difference in potential is made abruptly great and next made small in a stepwise manner. When two such signals are input, the elongating speed is made different from the contracting speed in the piezoelectric element 12, thereby allowing the driven member 16 to move.

For example, in FIGS. 15A and 15B, it is set that after one of the signals is increased to H (high) and decreased to L (low), the other signal is increased to H. In these signals, it is set that when one of them is decreased to L, the other signal is increased to H, after elapse of a certain time lag $t_{OFF}$. Further, when both of these two signals are decreased to L, the signals are output in an off state (open state).

Signals with the frequency exceeding an audible frequency are used for the output signals in FIGS. 15A and 15B, namely, electric signals for operating the piezoelectric element 12. In FIGS. 15A and 15B, these two signals are those having the frequency exceeding an audible frequency, and they are, for example, signals with the frequency preferably 30 to 80 kHz and more preferably 40 to 60 kHz. The signals with the above-described frequency are used to reduce operating sound in an audible region of the piezoelectric element 12.

Next, a description is given for operation of the driving mechanism according to the present embodiment.

In FIG. 9, electric signals are input to a piezoelectric element 12, by which the piezoelectric element 12 elongates and contracts repeatedly. A driving shaft 14 reciprocates in accordance with the elongation and contraction. In this case, the piezoelectric element 12 is allowed to elongate or contract at a different speed, thereby allowing the speed of the driving shaft 14 moving in a certain direction to be different from the speed moving in a reverse direction. Therefore, a driven member 16 and a zoom lens 70 are allowed to move in a desired direction.

On elongation and contraction of the piezoelectric element 12, vibration due to the elongation and contraction occurs. However, since an actuator 10 including the piezoelectric element 12 is supported by means of a support member 60 laterally in the elongating and contracting direction, vibration generated by the elongation and contraction of the piezoelectric element 12 is hardly transmitted outside the actuator 10. Consequently, resonance of the actuator 10 with an external member such as a fixed frame 24 is suppressed to reduce the effect of the resonance. Therefore, the driven member 16 and the zoom lens 70 are allowed to move accurately.

As described above, with the driving mechanism according to the present embodiment, the actuator 10 is supported laterally in the elongating and contracting direction of the piezoelectric element 12, thereby vibration of the actuator 24 is hardly transmitted to the member outside and the effect of the resonance can be reduced. Therefore, the driven member 16 and the zoom lens 70 are allowed to move accurately.

Fifth Embodiment

Next, a description is given for a driving mechanism according to a fifth embodiment of the present invention.

Figure 16:
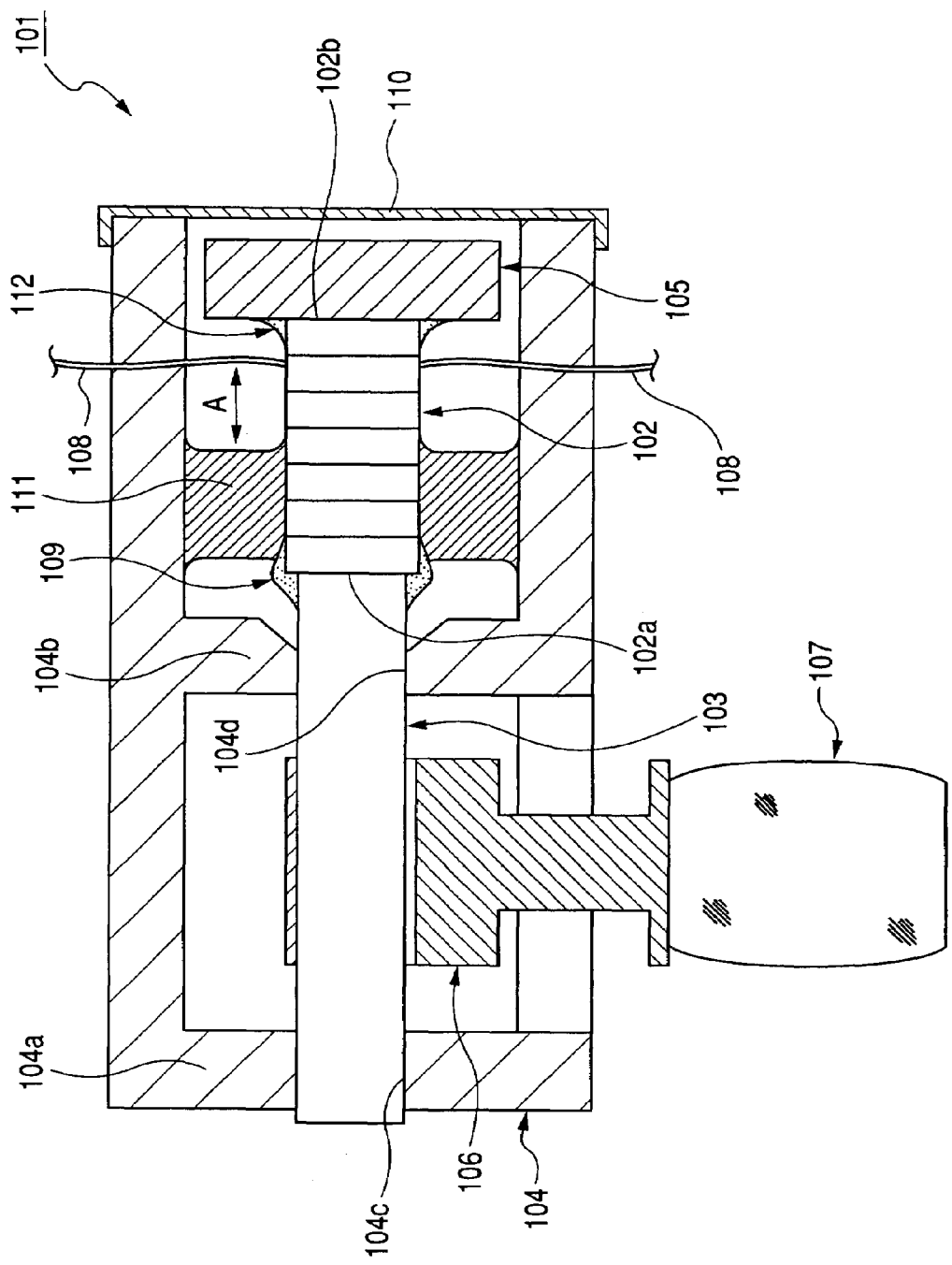
FIG. 16 is a longitudinal sectional view showing the driving mechanism according to a fifth embodiment of the present invention.

FIG. 16 is a longitudinal sectional view showing a driving mechanism according to the fifth embodiment of the present invention. The driving mechanism 101 of the fifth embodiment, for example, focus-drives a lens used in a digital camera, a camera-equipped cellular phone and the like.

The driving mechanism 101 is provided with a piezoelectric element 102, which is an electro-mechanical conversion element, a driving shaft (driving member) 103 mounted on one end along the axial direction of the piezoelectric element 102, a stationary member 104 for supporting the piezoelectric element 102 and the driving shaft 103, a weight member (weight) 105 mounted on the other end along the axial direction of the piezoelectric element 102, a friction member 106 making a frictional engagement with the driving shaft 103 so as to move in the axial direction and a zoom lens (driven member) 107 fixed to the friction member 106. In order to adjust the focus of the zoom lens 107 on automatic focus, the piezoelectric element 102 is used to drive the zoom lens 107 along the optical axis direction, for example, up to 1 mm.

The piezoelectric element 102 is made, for example, by laminating ceramic and the like. A lead wire 108 is electrically connected to the piezoelectric element 102. Next, the piezoelectric element 102 elongates and contracts in an axial direction (hereinafter, the axial direction is referred to as elongating and contracting direction A) by application of electric signals to be described later via the lead wire 108 from a controller (not shown).

The driving shaft 103 is light in weight and great in strength. It is made of, for example, carbon graphite or beryllium alloy and in a cylindrical shape. The driving shaft 103 is arranged coaxially with the piezoelectric element 102, in contact with one end surface 102a of the piezoelectric element 102 in the elongating and contracting direction A and bonded via an adhesive agent 109. The driving shaft 103 is not limited to a cylindrical shape, but may be in a rectangular shape.

The stationary member 104 functions as a frame body or a frame (frame member) for assembling the piezoelectric element 102 and the driving shaft 103. The stationary member 104 is provided with a front wall 104a constituting the frame which is shown on the left and an intermediate wall 104b at the mid-point of the elongating and contracting direction A. The front wall 104a is provided with a hole 104c and the intermediate wall 104b is provided with a hole 104d at a coaxial position with the hole 104c. The driving shaft 103 is movably inserted into the hole 104c and the hole 104d. In this case, the hole 104d is a tapered surface on the side of the piezoelectric element 102 in order to avoid interference of the piezoelectric element 102 with an adhesive agent 109 forming a joint with the driving shaft 103. A rear end of the stationary member 104 shown on the right is opened, and a protective plate 110 formed by bending a thin plate is attached to the rear end.

The weight member 105 abuts against the other end face 102b of the piezoelectric element 102 in the elongating and contracting direction A via an adhesive agent 112 not in contact with the stationary member 104 and the protective plate 100. The weight member 105 applies a load to the other end surface 102b of the piezoelectric element 102, thereby preventing a movement of the piezoelectric element 102, without a movement of the driving shaft 103 in the elongating and contracting direction A, and also transmits a satisfactory displacement or impact to the driving shaft 103 from the piezoelectric element 102 by decreasing the resonance frequency and eliminating disturbance of irregularities in frequency characteristics. Therefore, a material which is greater in mass than the driving shaft 103 and also soft is used as the weight member 105.

For example, where the driving shaft 103 is 8 mg and the piezoelectric element 102 is 32 mg, a weight member of 32 mg is used as a heavy weight member. Further, a member made of a flexible material is used as a soft weight member and a member smaller in Young's modulus than the piezoelectric element 102 or the driving shaft 103 is used. The Young's modulus is preferably 1 Gpa or lower and more preferably 300 Mpa or lower. Such a flexible material is prepared by mixing metal powders higher in specific gravity, for example, with an elastic body such as rubber and elastomer. They are prepared by mixing powders such as tungsten with, for example, urethane rubber or urethane resin. The weight member 105 is preferably as high as possible in specific gravity, in view of miniaturization of equipment and, for example, in a range of 8 to 12.

Figure 17:
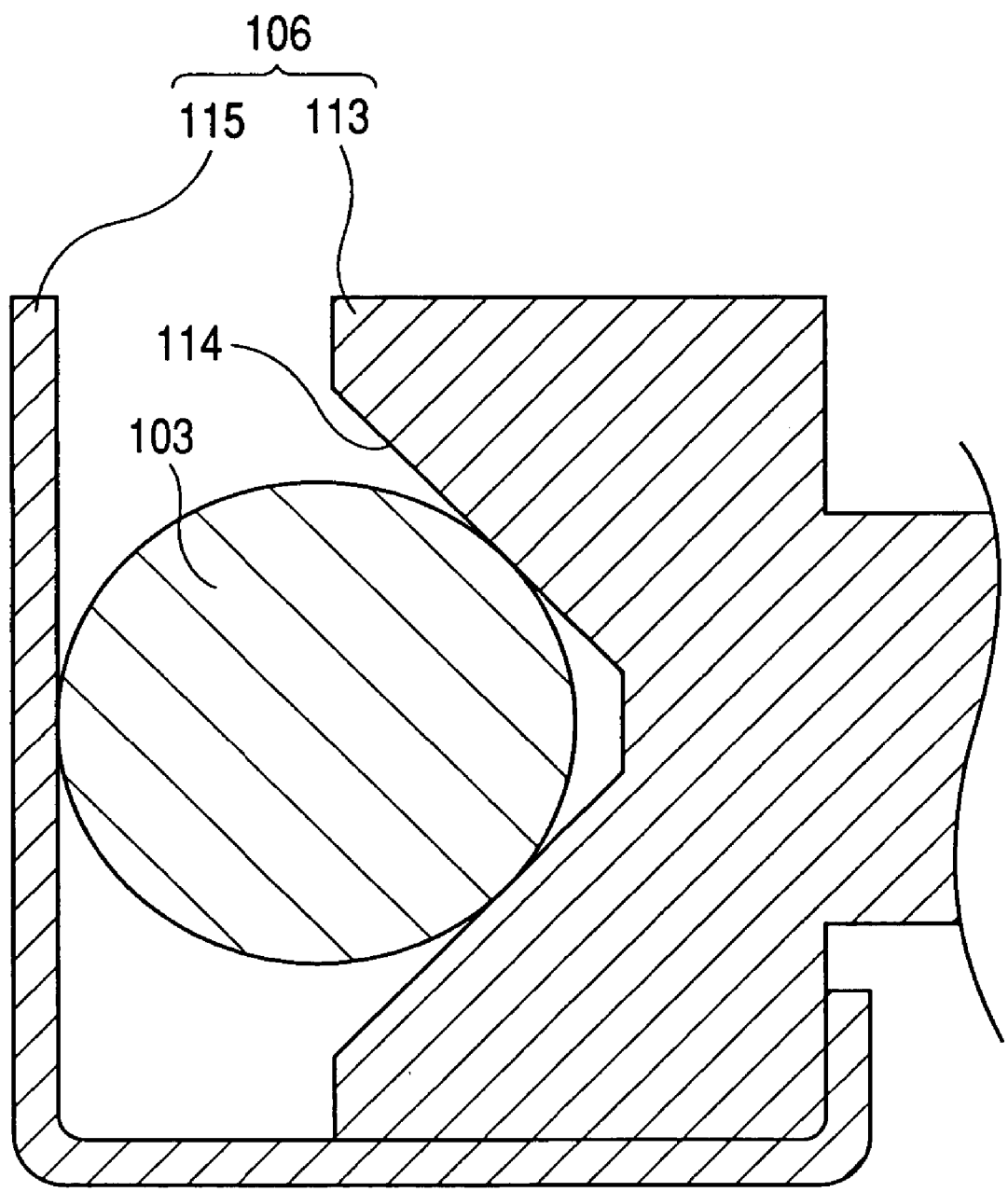
FIG. 17 is an enlarged transverse sectional view showing a friction member in FIG. 16.

The friction member 106 is frictionally engaged with a driving shaft 103 at a predetermined frictional force so as to slide. More specifically, as shown in FIG. 17, the driving shaft 103 advances into a V-shaped groove 114 mounted on a friction member body 113, and a blade spring 115 is attached so that the driving shaft 103 is urged to the friction member body 113. As will be described later, a predetermined frictional force between the friction member 106 and the driving shaft 103 is established to be greater than a driving force of the driving shaft 103 on a relatively gradual elongation and contraction of the piezoelectric element 102 and also smaller than a driving force of the driving shaft 103 on an abrupt elongation and contraction of the piezoelectric element 2.

The zoom lens 107 is to be moved by a driving mechanism 101 and, as shown in FIG. 16, fixed to the friction member body 113 of the friction member 106 so that the optical axis direction is parallel with the axial direction of the driving shaft 103. Thereby, the friction member 106 and the zoom lens 107 are driven in an integrated manner. Fixed lenses (not shown) are fixed to the stationary member 104 respectively at the front and rear sides along the optical axis direction of the zoom lens 107. The zoom lens 107 and the fixed lenses constitute a photographic optical system of a camera.

In particular, in the present embodiment, an elastic adhesive agent 111 is filled into a space between a range from the mid-point of the elongating and contracting direction A of the piezoelectric element 102 to the end surface of the driving shaft 3 and an inner surface of the further outer stationary member 104, and the piezoelectric element 102 is elastically supported by use of the elastic adhesive agent 111 to the stationary member 104 on the driving shaft 103. As the elastic adhesive agent 111 is to be used, for example, a silicone-based adhesive agent which is soft, low in specific gravity and relatively high in viscosity. More specifically, it is preferable to use an adhesive agent having shore hardness of 50 or lower, more preferably 30 to 40. Therefore, the elastic adhesive agent 111 supports the piezoelectric element 102, following the elongation and contraction of the piezoelectric element 102. Further, any adhesive agent may be used for the adhesive agent 111 as long as it is elastic, and, for example, an instantaneous adhesive agent and a UV adhesive agent which are elastic may be used.

An actuator comprising a piezoelectric element 102, a driving shaft 103 and a driven member 106 is supported laterally by the piezoelectric element 102 in the elongating and contracting direction by use of an elastic adhesive agent 111. In this case, it is preferable to support the actuator in a direction orthogonal to the elongating and contracting direction of the piezoelectric element 102. The elastic adhesive agent 111 functions as an attachment member for supporting laterally the actuator for attachment.

Next, the thus constituted driving mechanism 101 is provided as follows: a driving shaft 103 is bonded to one end surface 102a of a piezoelectric element 102 via an adhesive agent 109, a weight member 105 is also bonded to the other end surface 102b of the piezoelectric element 102 via an adhesive agent 112, the driving shaft 3 is inserted into a hole 104c and a hole 104d of a stationary member 104 while the piezoelectric element 102 and the weight member 105 are allowed to insert into the stationary member 104, a friction member 106 equipped with a zoom lens 107 is attached to the driving shaft 103, an elastic adhesive agent 111 is filled from above to the driving shaft 103 of the piezoelectric element 102 inside the stationary member 104 and finally a protective plate 110 is attached to the stationary member 104.

In the above-described driving mechanism 101, where the zoom lens 107 is moved, for example, as shown in FIG. 2A and FIG. 2B, a substantially serrate pulse voltage is continuously applied to the piezoelectric element 102.

More specifically, when a pulse voltage shown in FIG. 2A is applied, the piezoelectric element 102 elongates in a relatively gradual manner from a time $\alpha 1$ to a time $\alpha 2$, and the driving shaft 103 moves to the left as shown at a relatively slow speed (hereinafter, referred to as "advancement"). In this case, since inertia working between the friction member 106 and the zoom lens 107 is smaller than a frictional force between the friction member 106 and the driving shaft 103, the friction member 106 and the zoom lens 107 advance in an integrated manner together with the driving shaft 103 by the frictional force. At a time $\alpha 3$, the piezoelectric element 102 abruptly contracts and the driving shaft 103 moves to the right side as shown in the figure at a greater speed (hereinafter referred to as "retraction"). In this case, since inertia working between the friction member 106 and the zoom lens 107 is greater than a frictional force between the friction member 106 and the driving shaft 103, only the driving shaft 103 retracts, while the friction member 106 and the zoom lens 107 hardly move in practice. Therefore, the pulse voltage shown in FIG. 2A is continuously applied to repeat such a motion, thereby allowing the zoom lens 107 to advance.

In contrast, when a pulse voltage shown in FIG. 2B is applied, the wave pattern of the pulse voltage is reversed to that shown in FIG. 2A in the gradual and abrupt movement. Therefore at a time $\oplus 1$ only the driving shaft 103 retracts and the friction member 106 and the zoom lens 107 hardly move in practice, whereas from a time $\beta 2$ to a time $\beta 3$, the friction member 106 and the zoom lens 107 retract in an integrated manner, together with the driving shaft 103. Therefore, the pulse voltage shown in FIG. 2B is continuously applied to repeat such a motion, thereby allowing the zoom lens 107 to retract.

In the driving mechanism 101 of the fifth embodiment which performs driving as described above, the piezoelectric element 102 is elastically supported by the stationary member 104 by means of the elastic adhesive agent 111. Therefore, for example, even where the driving mechanism 101 is dropped, and an impact force is applied thereto, an elastic force kept by the elastic adhesive agent 111 alleviates the impact force, thereby making it possible to prevent breakage of the respective parts and joints in the driving mechanism 101. Further, the elastic force kept by the elastic adhesive agent 111 is able to suppress the transmission of vibration between the stationary member 104 and the piezoelectric element 102 and also prevent the effect of resonance, thereby making it possible to move the driving shaft 103 in the elongating and contracting direction A reliably and accurately.

Further, since the piezoelectric element 102 is elastically supported by the driving shaft 103 side, it is possible to suppress more effectively warpage and deflection on the driving shaft 103 side of the piezoelectric element 102 and also move the driving shaft 103 further reliably and accurately. In addition, in this case, as compared with a case where an entire part of the piezoelectric element 102 is elastically supported by a stationary member 104 by means of an elastic adhesive agent, the piezoelectric element 102 is not inhibited to elongate and contract by the elastic adhesive agent 111, thereby making it possible to move the driving shaft 103 further reliably and accurately.

Further, in the driving mechanism 101, the piezoelectric element 102 is elastically supported by the driving shaft 103 side and also the weight member 105 is not in contact with the stationary member 104 and the protective plate 110. In other words, the other end of the piezoelectric element 102 in the elongating and contracting direction A is kept free. Therefore, the driving shaft 103 side of the piezoelectric element 102 is elastically supported to solve such a problem that when the piezoelectric element 102 is not supported, the driving shaft 103 does not move but the piezoelectric element 102 is moved, making it possible to move the driving shaft 103 further reliably and accurately.

Still further, since the piezoelectric element 102 is elastically supported by the driving shaft 103 side and also the other side of the piezoelectric element 102 is kept free, it is possible to prevent the driving shaft 103 of the stationary member 104 and the piezoelectric element 102 from being excessively restrained. As a result, it is possible to prevent unnecessary actions of stress which develop at a joint of the stationary member 104 with the driving shaft 103 and also to prevent breakage of the joint.

In addition, in the driving mechanism 101, since the weight member 105 is provided on the other end of the piezoelectric element 102, such a possibility is further reliably removed that the driving shaft 103 does not move but the piezoelectric element 102 is moved, and the driving shaft 103 is, therefore, allowed to move further reliably and accurately. Also, since the weight member 105 is soft and heavy, it is possible to reduce the resonance frequency of the driving mechanism 101 to drive the piezoelectric element 102 in a range free from any adverse effect of resonance. At the same time, it is possible to eliminate disturbance of irregularities in frequency characteristics to suppress more effectively warpage and deflection of the piezoelectric element 102 which may displace in a direction other than the elongating and contracting direction A and also to move the driving shaft 103 further reliably and accurately. Also, since the weight member 105 is not supported by the elastic adhesive agent 111, it is possible to exhibit effectively the above-described actions and effects of the weight member 105.

It may be possible that in place of the elastic adhesive agent 111, for example, an elastic annular body such as rubber is fitted into the piezoelectric element 102 and elastically supported by a stationary member 104. However, in this case, it is not preferable because the number of parts constituting the driving mechanism 101 is increased, and adhesion between the piezoelectric element 102 and the elastic annular body and between the annular body and the stationary member 104 is further required.

Figure 18:
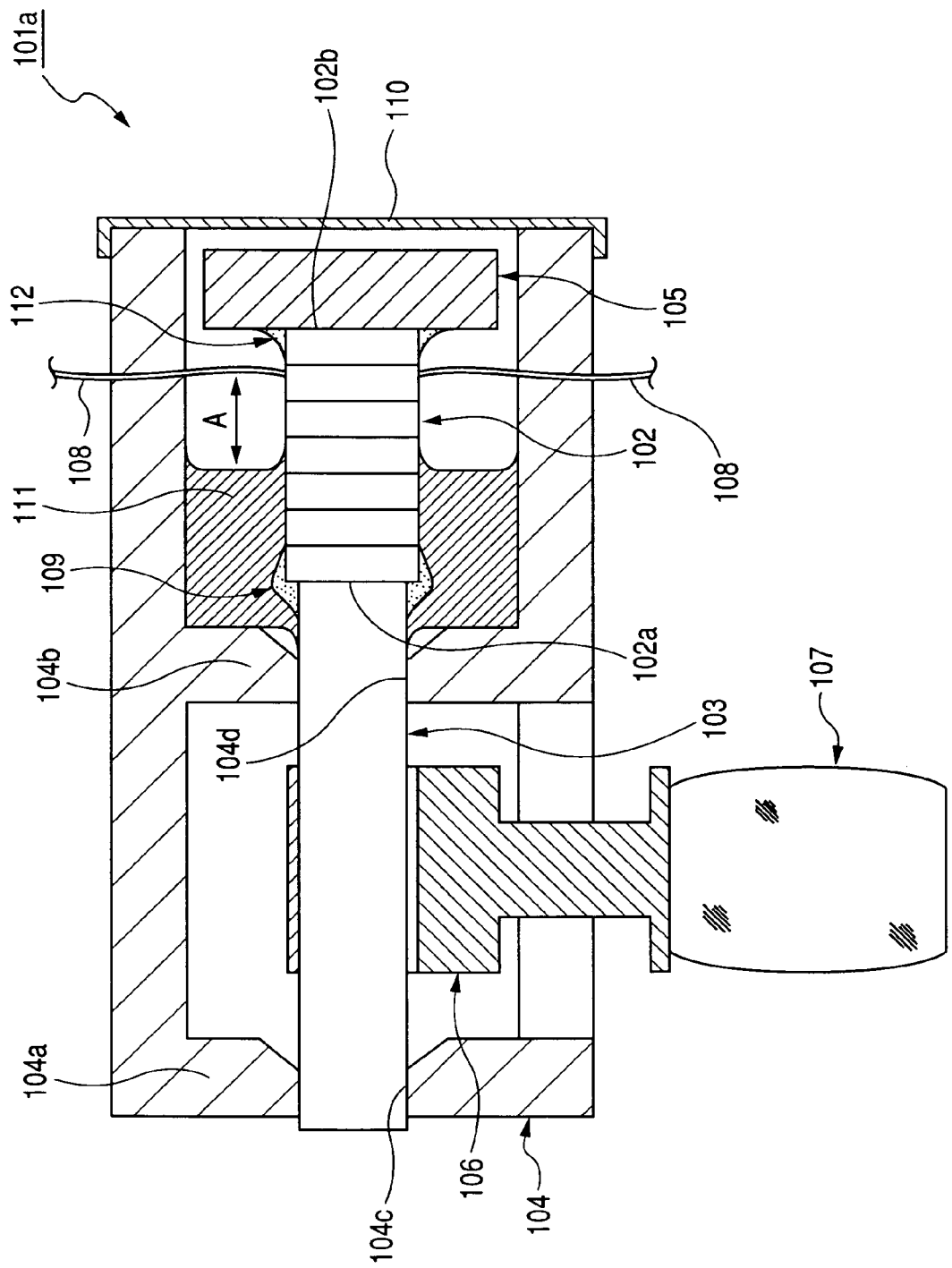
FIG. 18 is a longitudinal sectional view showing a modification of the driving mechanism according to the fifth embodiment of the present invention.

FIG. 18 is a schematic sectional view showing a modification of a driving mechanism according to the present embodiment. A driving mechanism 101a of the modification is different from the driving mechanism 101 of the fifth embodiment in that the elastic adhesive agent 111 is filled up to a intermediate wall 104b of the stationary member 104.

As a matter of course, the thus constituted driving mechanism 101a provides an effect similar to that of the fifth embodiment. In addition, since the elastic adhesive agent 111 is filled up to the intermediate wall 104b, a joint of the piezoelectric element 102 with the driving shaft 103 is also elastically supported to increase the strength of the joint. Consequently, a possible breakage of the joint is more effectively prevented.

Further, no clearance is needed between one end surface 102a of the piezoelectric element 102 and the intermediate wall 104b of the stationary member 104 therefore manufacturing is facilitated to increase productivity.

Figure 19:
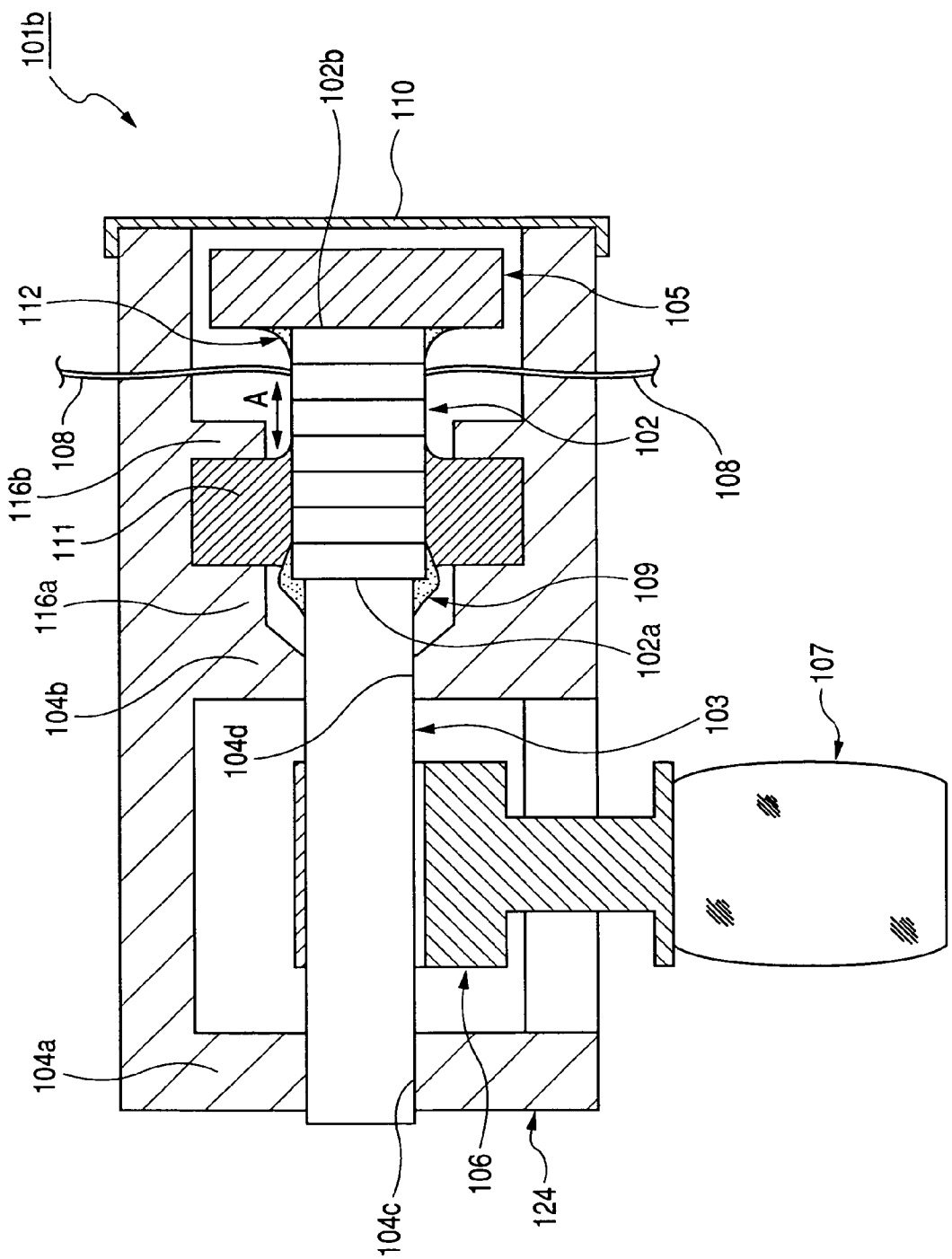
FIG. 19 is a longitudinal sectional view showing a modification of the driving mechanism according to the fifth embodiment of the present invention.

FIG. 19 is a schematic sectional view showing another modification of the driving mechanism according to the fifth embodiment of the present invention. A driving mechanism 101b of the modification is different from the driving mechanism 101 of the fifth embodiment in that in place of the stationary member 104, a stationary member 124 is used which is provided with a partition wall 116a and a partition wall 116b projecting from an outer wall surrounding the piezoelectric element 102 toward the piezoelectric element 102 and annexed along the elongating and contracting direction A, the elastic adhesive agent 111 is provided so as to be filled into a space between the partition wall 116a and the partition wall 116b, thereby elastically supporting the driving shaft 103 of the piezoelectric element 102.

Even the thus constituted driving mechanism 101b is also able to provide an effect similar to that of the fifth embodiment. In addition, since the partition wall 116a and the partition wall 116b are provided, the elastic adhesive agent 111 is prevented from being discharged in the elongating and contracting direction A of the piezoelectric element 102. For example, it is possible to prevent the driving shaft 103 from being contaminated by discharge of the elastic adhesive agent before curing to result in a driving failure. In addition, the elastic adhesive agent 111 is easily filled, and the filling position is fixed, thereby improving productivity and stabilizing quality.

An explanation has been so far made for preferable embodiments of the present invention, however, the present invention is not limited thereto. For example, in the above-described embodiment, it is particularly preferable to keep free the other end of the piezoelectric element 2 in the elongating and contracting direction A. It may also be possible that the other end is fixed to a stationary member 104 or a protective plate 110 and used as a fixed end.

Further, in the above-described embodiment, the weight member 105 is provided on the other end of the piezoelectric element 102 in the elongating and contracting direction A and it is particularly preferable that the weight member 105 is soft and heavy, the prevent invention is not limited thereto. The weight member 105 is also used to increase mobility of the driving shaft 103 in the elongating and contracting direction A. However, the weight member 105 may be omitted.

Further, in the above-described embodiment, a frequency of the pulse voltage applied to the piezoelectric element 102 is equal where the zoom lens 107 advances and retracts. However, the frequency may be different.

Further, the piezoelectric element 102 is used as an electromechanical conversion element, but, for example, artificial muscle polymers and the like may be used, as long as they elongate and contract according to input of an electric signal.

Further, in the above-described embodiment, a driven member is used as a zoom lens 107, but a lens frame holding the zoom lens 107 or others may be used for this purpose.

Still further, in the above-described embodiment, it is particularly preferable to support elastically the driving shaft 103 of the electro-mechanical conversion element 102 to stationary members 104 and 124 via the elastic adhesive agent 111. The driving shaft 103 of the electro-mechanical conversion element 102 may be supported by the stationary members 104 and 124 via a rigid adhesive agent, although the effect may be reduced to some extent.

Sixth Embodiment

Next, a description is given for a driving mechanism according to a sixth embodiment of the present invention.

Figure 20:
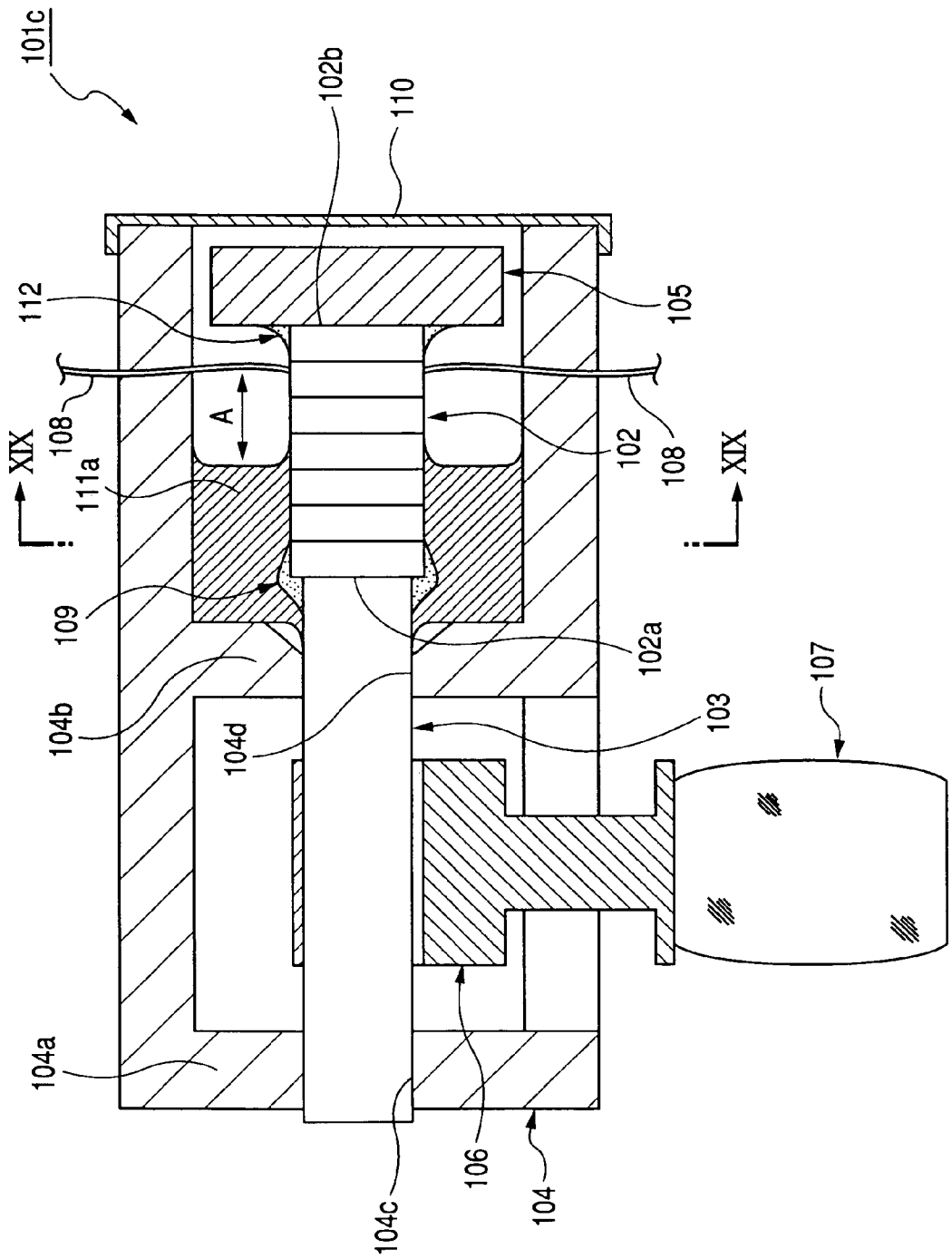
FIG. 20 is a longitudinal sectional view showing the driving mechanism according to a sixth embodiment of the present invention.

FIG. 20 is a longitudinal sectional view showing the driving mechanism according to the sixth embodiment of the present invention. A driving mechanism 101*c* of the sixth embodiment focus-drives the lens used in a digital camera, a camera-equipped cellular phone and the like. Further, in FIG. 20 the front part on the page surface is considered as above.

The driving mechanism 101*c* is provided with a piezoelectric element 102, which is an electro-mechanical conversion element, a driving shaft (driving member) 103 mounted on one end along the axial direction of the piezoelectric element 102, a stationary member 104 for supporting the piezoelectric element 102 and the driving shaft 103, a weight member (weight) 105 mounted on the other end along the axial direction of the piezoelectric element 102, a friction member 106 frictionally engaging with the driving shaft 103 so as to move in the axial direction and a zoom lens (driven member) 107 fixed to the friction member 106, which drives the zoom lens 107 along the optical axial direction, for example, by up to approximately 1 mm by the piezoelectric element 102 to adjust the focus of the zoom lens 107 on automatic focusing.

The piezoelectric element 102 is formed, for example, by laminating ceramic and the like. A lead wire 108 is electrically connected to the piezoelectric element 102. Next, the piezoelectric element 102 elongates and contracts in the axial direction. (hereinafter, the axial direction is referred to as elongating and contracting direction A) by application of an electric signal to be described later via the lead wire 108 from a controller (not shown). In the present embodiment, the piezoelectric element 102 is used as an electro-mechanical conversion element, but, for example, artificial muscle polymers and the like may be used, as long as they can elongate and contract according to input of an electric signal.

A driving shaft 103 is light in weight, rigid, and great in strength. It is made, for example, of carbon graphite or beryllium alloy and in a cylindrical shape. The driving shaft 103 is arranged coaxially with the piezoelectric element 102, in contact with one end surface 102*a* of the piezoelectric element 102 in the elongating and contracting direction A and bonded via an adhesive agent 109. The driving shaft 103 is not limited to a cylindrical shape but may be in a rectangular shape.

A stationary member 104 functions as a frame body (frame member) for assembling the piezoelectric element 102 and the driving shaft 103. The stationary member 104 is provided with a front wall 104*a* constituting the frame which is shown on the left side in the figure and an intermediate wall 104*b* at the mid-point of the elongating and contracting direction A. The front wall 104*a* is provided with a hole 104*c*, the intermediate wall 104*b* is provided with a hole 104*d* at a coaxial position of the 104*c*, and the driving shaft 103 is movably inserted into the hole 104*c* and the hole 104*d*. In this case, the 104*d* is a tapered surface on the side of the piezoelectric element 102 in order to avoid interference of the piezoelectric element 102 with an adhesive agent 109 forming a joint with the driving shaft 103. A rear end of the stationary member 104 shown on the right side in the figure is opened, and a protective plate 110 formed by bending a thin plate is attached to the rear end.

The weight member 105 abuts against the other end face 102*b* of the piezoelectric element 102 in the elongating and contracting direction A via an adhesive agent 112 not in contact with the stationary member 104 and the protective plate 110. The weight member 105 applies a load to the other end surface 102*b* of the piezoelectric element 102, thereby preventing a movement of the piezoelectric element 102, without a movement of the driving shaft 103 in the elongating and contracting direction A, and also transmits a satisfactory displacement or impact to the driving shaft 103 from the piezoelectric element 102 by decreasing the resonance frequency and eliminating disturbance of irregularities in frequency characteristics. Therefore, a material which is greater in mass than the driving shaft 103 and also soft is used as the weight member 105.

For example, where the driving shaft 103 is 8 mg and the piezoelectric element 102 is 32 mg, a weight member of 32 mg is used as a heavy weight member. Further, a member made of a flexible material is used as a soft weight member and a member smaller in Young's modulus than the piezoelectric element 102 and the driving shaft 103 is used. The Young's modulus is preferably 1 Gpa or lower and more preferably 300 Mpa or lower. Such a flexible material is prepared by mixing metal powders higher in specific gravity, for example, with an elastic body such as rubber and elastomer. They are prepared by mixing powders such as tungsten with, for example, urethane rubber or urethane resin. The weight member 105 is preferably as high as possible in specific gravity, in view of miniaturization of equipment and, for example, in a range of 8 to 12.

The friction member 106 is frictionally engaged with a driving shaft 103 at a predetermined frictional force so as to slide. More specifically, as shown in FIG. 17, the driving shaft 103 enters a V-shaped groove 114 mounted on a friction member body 113, and a blade spring 115 is attached so that the driving shaft 103 is urged to the friction member body 113. As will be described later, a predetermined frictional force between the friction member 106 and the driving shaft 103 is established to be greater than a driving force of the driving shaft 103 on a relatively gradual elongation and contraction of the piezoelectric element 102 and also smaller than a driving force of the driving shaft 103 on abrupt elongation and contraction of the piezoelectric element 2.

The zoom lens 107 is to be moved by a driving mechanism 101 and, as shown in FIG. 20, fixed to the friction member body 113 of the friction member 106 so that the optical axis direction is parallel with the axial direction of the driving shaft 103. Thereby, the friction member 106 and the zoom lens 107 are driven in an integrated manner. Fixed lenses (not shown) are fixed to the stationary member 104 respectively at the front and rear sides along the optical axis direction of the zoom lens 107. The zoom lens 107 and the fixed lenses constitute a photographic optical system of a camera.

Figure 21:
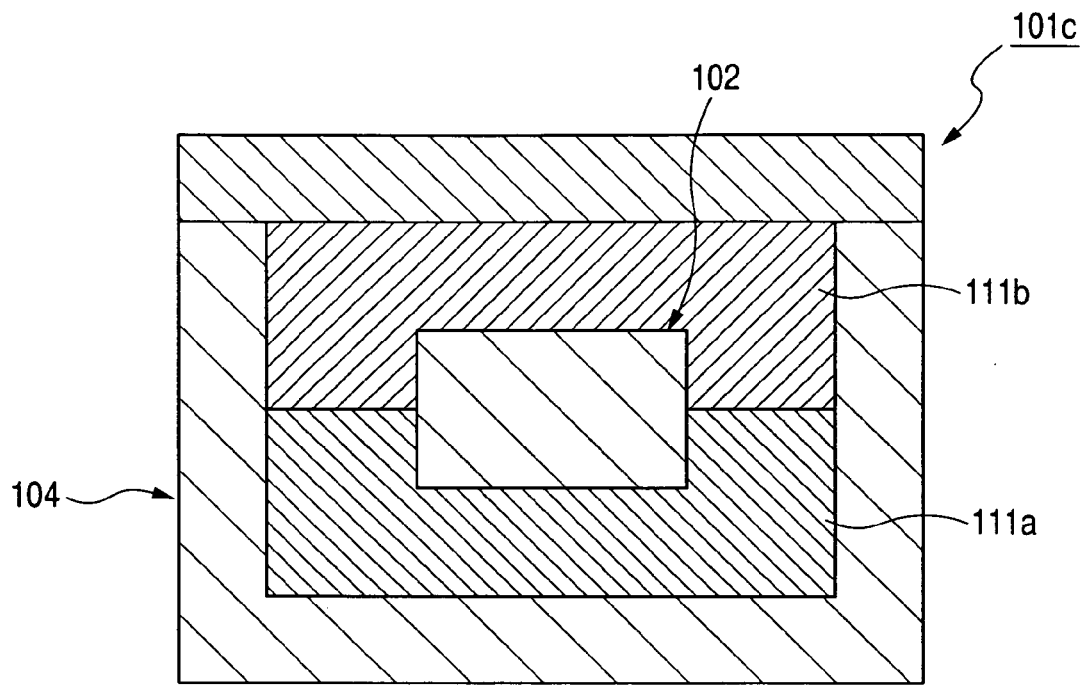
FIG. 21 is a transverse sectional view taken along line XIX-XIX in FIG. 20.

In particular, in the present embodiment, an self-curing adhesive agent 111*a* and a UV adhesive agent 111*b* are filled into a range from the mid-point of the elongating and contracting direction A of the piezoelectric element 102 to the intermediate wall 104*b* of the stationary member 104 inside the stationary member 104, by which the piezoelectric element 102 is elastically supported by the stationary member 104. More specifically, as shown in FIG. 21, the self-curing adhesive agent 111*a* is filled into the lower side inside the stationary member 104 so as to immerse a portion lower than approximately half of the piezoelectric element 102. The UV adhesive agent 111b is laminated and filled on the self-curing adhesive agent 111a in the upper side inside the stationary member 104 so as to cover a portion higher than approximately half of the piezoelectric element 102.

The self-curing adhesive agent 111a includes, for example, a silicone-based adhesive agent which is soft, low in specific gravity and relatively high in viscosity and characterized in curing naturally with the lapse of time. More specifically, preferable is an agent having shore hardness of 50 or lower, and more preferably 30 to 40. Further, the UV adhesive agent 111b includes an agent which is relatively soft, elastic and characterized in curing fast on radiation of ultraviolet rays. Therefore, the self-curing adhesive agent 111a and the UV adhesive agent 111b support the piezoelectric element 102, following elongation and contraction of the piezoelectric element 102.

The actuator comprising a piezoelectric element 102, a driving shaft 103 and a driven member 106 is supported laterally by use of an elastic adhesive agent 111 in the elongating and contracting direction of the piezoelectric element 102. In this case, it is preferable to support the actuator in a direction orthogonal to the elongating and contracting direction of the piezoelectric element 102. The elastic adhesive agent 111 functions as an attachment member for supporting the actuator laterally.

In order to obtain the above-described driving mechanism 101c, at first, a driving shaft 103 is bonded to one end surface 102a of the piezoelectric element 102 via an adhesive agent 109, and a weight member 105 is also bonded to the other end surface 102b of the piezoelectric element 102 via an adhesive agent 112, the driving shaft 103 is inserted into the hole 104c and the 104d of the stationary member 104, while the piezoelectric element 102 and the weight member 105 are allowed to insert into the stationary member 104, and a friction member 106 equipped with a zoom lens 107 is attached to the driving shaft 103.

Next, a jig (not shown) is arranged so that a range into which the self-curing adhesive agent 111a is filled is positioned and formed, the self-curing adhesive agent 111a is poured from above and filled at a predetermined quantity into the lower side inside the stationary member 104, the UV adhesive agent 111b is poured so as to be laminated on the self-curing adhesive agent 111a and filled at a predetermined quantity into the stationary member 104, and the thus filled UV adhesive agent 111b is subjected to radiation of ultraviolet rays from above and to fast curing. In this case, the self-curing adhesive agent 111a which is not yet cured and requiring a prolonged curing time is temporarily fixed by use of the UV adhesive agent 111b which has been fast cured, thereby allowing the filled agent to remain at the filled range. Next, after the UV adhesive agent 111b is fast cured, the jig is removed and used for a next driving mechanism. In a mechanism from which the jig is removed, a protective plate 110 is attached to the stationary member 104 to provide the driving mechanism 101c.

In the driving mechanism 101c, where the zoom lens 107 is moved, for example, as shown in FIG. 2A and FIG. 2B, a substantially serrate pulse voltage is continuously applied to the piezoelectric element 102.

More specifically, when a pulse voltage shown in FIG. 2A is applied, the piezoelectric element 102 elongates in a relatively gradual manner from a time $\alpha 1$ to a time $\alpha 2$, and the driving shaft 103 moves to the left side as shown in the figure at a relatively slow speed (hereinafter, referred to as "advancement"). In this case, since inertia working between the friction member 106 and the zoom lens 107 is smaller than a frictional force between the friction member 106 and the driving shaft 103, the friction member 106 and the zoom lens 107 advance in an integrated manner together with the driving shaft 103 by the frictional force. At a time $\alpha 3$, the piezoelectric element 102 abruptly contracts and the driving shaft 103 moves to the right side as shown in the figure at a great speed (hereinafter referred to as "retraction"). In this case, since inertia working between the friction member 106 and the zoom lens 107 is greater than a frictional force between the friction member 106 and the driving shaft 103, only the driving shaft 103 retracts, while the friction member 106 and the zoom lens 107 hardly move in practice. Therefore, the pulse voltage shown in FIG. 2A is continuously applied to repeat such a motion, thereby allowing the zoom lens 107 to advance.

In contrast, when a pulse voltage shown in FIG. 2B is applied, the wave pattern of the pulse voltage is reversed to that shown in FIG. 2A in the gradual and abrupt movement. Therefore at a time $\beta 1$ only the driving shaft 103 retracts and the friction member 106 and the zoom lens 107 hardly move in practice, whereas from a time $\beta 2$ to a time $\beta 3$, the friction member 106 and the zoom lens 107 retract in an integrated manner, together with the driving shaft 103. Therefore, the pulse voltage shown in FIG. 2B is continuously applied to repeat such a motion, thereby allowing the zoom lens 107 to retract.

In the driving mechanism 101c according to the sixth embodiment which performs driving as described above, the piezoelectric element 102 is elastically supported by the stationary member 104 by use of the self-curing adhesive agent 111a and US adhesive agent 111b. Therefore, for example, even where the driving mechanism 101 is dropped, and an impact force is applied thereto, an elastic force kept by the self-curing adhesive agent 111a and UV adhesive agent 111b alleviate the impact force, thereby making it possible to prevent breakage of the respective parts and joints in the driving mechanism 101c. Further, the elastic force is able to suppress the transmission of vibration between the stationary member 104 and the piezoelectric element 102 and also suppress the effect of resonance, thereby making it possible to move the driving shaft 103 in the elongating and contracting direction A reliably and accurately. As described above, since the piezoelectric element 102 is supported elastically, it is possible to suppress more effectively warpage and deflection on the driving shaft 103 side of the piezoelectric element 102 and also move the driving shaft 103 further reliably and accurately. Therefore, such a problem is solved that when the piezoelectric element 102 is not supported, the driving shaft 103 does not move but the piezoelectric element 102 moves, thereby making it possible to move the driving shaft 103 further reliably and accurately.

Further, since the piezoelectric element 102 is not fixed to the stationary member 104 but elastically supported by use of the self-curing adhesive agent 111a and the UV adhesive agent 111b, it is possible to prevent the driving shaft 103 of the stationary member 104 and the piezoelectric element 102 from being excessively restrained. As a result, it is possible to prevent not only unnecessary actions of stress which develop at a joint of the stationary member 104 with the driving shaft 103 but also breakage of the joint.

Further, since the self-curing adhesive agent 111a and the UV adhesive agent 111b are used as an adhesive agent for elastically supporting the piezoelectric element 102, the UV adhesive agent 111b temporarily fixes the self-curing adhesive agent 111a, by which a jig for positioning a range into which the self-curing adhesive agent 111a is filled is removed and used for next equipment, thereby increasing the productivity. For example, a problem where a UV adhesive agent is used exclusively, the adhesive agent filled, below the piezoelectric element 102 is not to be cured because no ultraviolet rays reach and the uncured UV adhesive agent may be discharged can be solved by the self-curing adhesive agent 111*a* filled into a range where no ultraviolet rays reach. It is, therefore, possible to prevent the driving shaft 103 from being contaminated by discharge of the adhesive agent to result in a driving failure and to obtain desired driving characteristics.

Further, the present embodiment provides the following actions and effects. More specifically, since the piezoelectric element 102 is elastically supported by the driving shaft 103 side, it is possible to suppress more effectively warpage and deflection on the driving shaft 103 side of the piezoelectric element 102 and also move the driving shaft 103 side further reliably and accurately. In addition, in this case, as compared with a case where an entire part of the piezoelectric element 102 is elastically supported on a stationary member 104, the piezoelectric element 102 is not inhibited to elongate and contract, thereby making it possible to move the driving shaft 103 further reliably and accurately.

Still further, the self-curing adhesive agent 111*a* and the UV adhesive agent 111*b* are filled up to the intermediate wall 104*b*, thereby making it possible to elastically support a joint of the piezoelectric element 102 with the driving shaft 103 and also to increase the strength of the joint. As a result, breakage of the joint can be prevented.

In addition, since a weight member 105 is provided on the other end of the piezoelectric element 102 in the elongating and contracting direction A, such a possibility is further reliably removed that the driving shaft 103 does not move to the piezoelectric element 102 in the elongating and contracting direction A but the piezoelectric element 102 moves, and the driving shaft 103 is allowed to move further reliably and accurately. Also, since the weight member 105 is soft and heavy, it is possible to reduce the resonance frequency of the driving mechanism 111*c* to drive the piezoelectric element 102 in a range free from any adverse effect of resonance. At the same time, it is possible to eliminate irregularities of disturbance in frequency characteristics to suppress more effectively warpage and deflection of the piezoelectric element 102 which may displace in a direction other than the elongating and contracting direction A and also to move the driving shaft 103 further reliably and accurately. Also, since the weight member 105 is not supported by use of the self-curing adhesive agent 111*a* or the UV adhesive agent 111*b*, it is possible to exhibit effectively the above-described actions and effects of the weight member 105.

Further, in the present embodiment, the self-curing adhesive agent 111*a* and the UV adhesive agent 111*b* are filled up to an intermediate wall 104*b* of a stationary member 104. However, a clearance may be provided between the piezoelectric element 102 and the intermediate wall 104*b* of the stationary member 104;

It may be possible that in place of the self-curing adhesive agent 111*a* and the UV adhesive agent 111*b*, for example, an elastic annular body such as rubber is fitted into the piezoelectric element 102 and elastically supported by the stationary member 104. However, in this case, it is not preferable because the number of parts constituting the driving mechanism 101 is increased, and adhesion between the piezoelectric element 102 and the elastic annular body and between the annular body and the stationary member 104 is further required.

Figure 22:
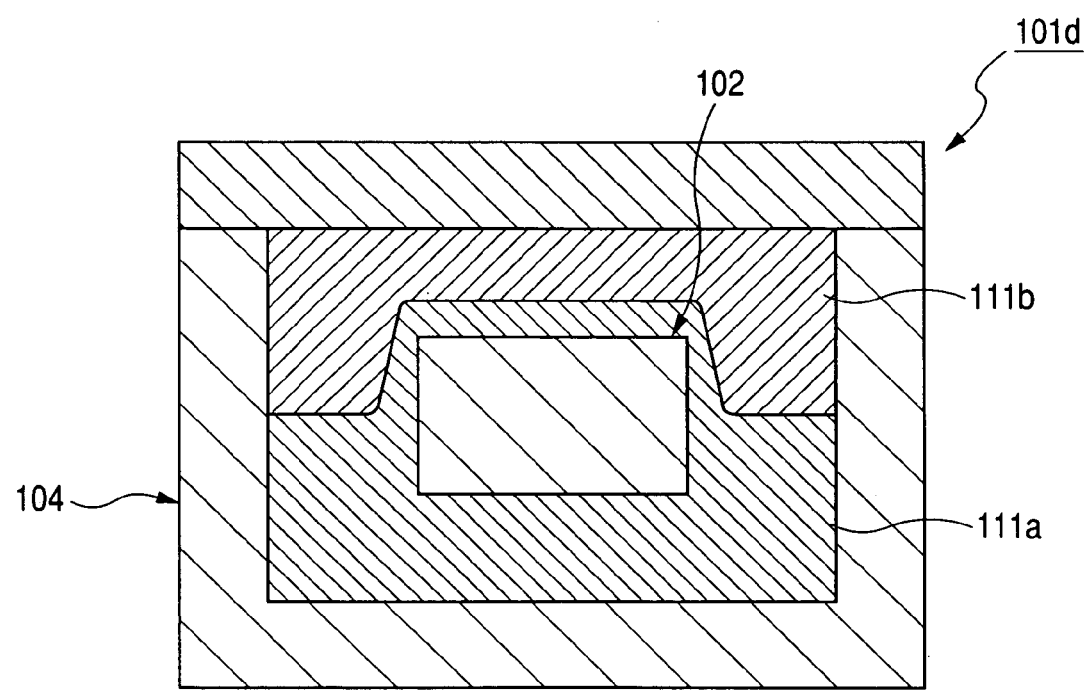
FIG. 22 is a drawing of a modification of the driving mechanism according to the sixth embodiment of the present invention, which is shown by a transverse sectional view corresponding to FIG. 21.

FIG. 22 is a transverse sectional view showing a modification of the driving mechanism according to the sixth embodiment. The driving mechanism 101*d* of the modification is different from the driving mechanism 101*c* according to the sixth embodiment in that the self-curing adhesive agent 111*a* is filled so as to cover the external form of the piezoelectric element 102, and the U adhesive agent 111*b* is laminated and filled on the self-curing adhesive agent 111*a*.

As a matter of course, even the thus constituted driving mechanism 101*d* also provides an effect similar to that of the sixth embodiment. In addition, since the self-curing adhesive agent 111*a*, which is greater in elasticity, is filled so as to cover the external form of the piezoelectric element 102, it is possible to elastically support the piezoelectric element 102 further reliably and also to fill the UV adhesive agent 111*b* in a small quantity, thereby reducing the curing time of the UV adhesive agent 111*b*.

A description has been given for preferable embodiments of the present invention, however, the present invention is not limited thereto. In the above-described embodiments, it is particularly preferable that an adhesive agent to be filled first is a silicone-based self-curing adhesive agent and an adhesive agent to be filled later is a UV adhesive agent. However, for example, an adhesive agent to be filled first may be a silicone-based self-curing adhesive agent and an adhesive agent to be filled later may be an elastic instantaneous adhesive agent, and adhesive agents to be used may include a combination of adhesive agents with a different curing time and a combination of adhesive agents with a different curing method. Adhesive agents with a different curing time include, for example, an self-curing adhesive agent, an instantaneous adhesive agent and a UV adhesive agent. Those with a different curing method include, for example, a UV adhesive agent to which ultraviolet ray is applied, a thermosetting adhesive agent to which heat is given and an self-curing adhesive agent which is allowed to stand.

Further, in the above-described embodiments, two types of adhesive agents are used as a plurality of adhesive agents. However, three or more types of them may be used.

Further, in the above-described embodiment, it is particularly preferable to support the driving shaft 103 side of the piezoelectric element 102 by use of a plurality of adhesive agents. However, the plurality of adhesive agents may be used to support a weight member 105 or the plurality of adhesive agents may be used to support an entire part of the piezoelectric element 102.

Further, in the above-described embodiment, the other end of the piezoelectric element 102 in the elongating and contracting direction A is as a free end. However, the other end thereof may be fixed to a stationary member 4 or a protective plate 110 and used as a fixed end.

Further, in the above-described embodiment, a weight member 105 is provided on the other end of the piezoelectric element 102 in the elongating and contracting direction A and it is particularly preferable that the weight member 105 is soft and heavy. However, the present invention is not limited thereto. The weight member 105 is used to increase mobility of the driving shaft 103 in the elongating and contracting direction A. However, the weight member 105 may not be used.

Further, in the above-described embodiment, the frequency of the pulse voltage applied to the piezoelectric element 102 may be equal where the zoom lens 107 is advanced or retracted. However, it may be different.

Further, in the above-described embodiment, a zoom lens 107 is used as a driven member. However, a lens frame for holding the zoom lens 107 may be used or any other member may be used.

Still further, in the above-described embodiment, it is particularly preferable that the electro-mechanical conversion element 102 is elastically supported by a stationary member 104 via an elastic adhesive agent. The stationary member 104 may be supported by use of a rigid adhesive agent, although the effect is reduced to some extent.

Seventh Embodiment

Next, a description is given for a driving mechanism according to a seventh embodiment of the present invention.

Figure 23:
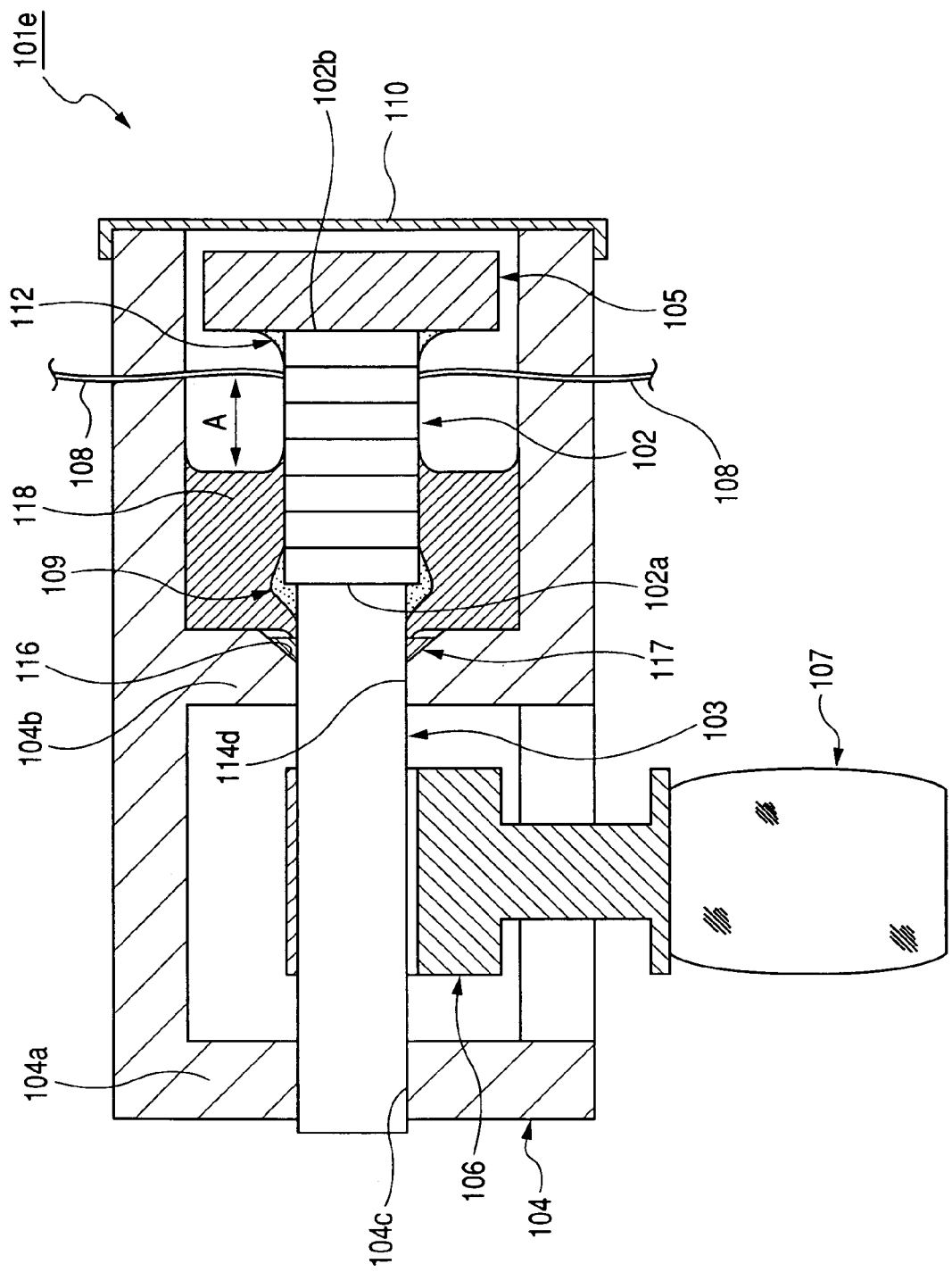
FIG. 23 is a longitudinal sectional view showing the driving mechanism according to a seventh embodiment of the present invention.

FIG. 23 is a longitudinal sectional view showing a driving mechanism according to the seventh embodiment of the present invention. The driving mechanism 101e of the seventh embodiment is to focus-drive a lens used in a digital camera, a camera-equipped cellular phone and the like.

The driving mechanism 101e is provided with a piezoelectric element 102, which is an electro-mechanical conversion element, a driving shaft (diving member) 103 mounted on one end along the axial direction of the piezoelectric element 102, a stationary member 104 for supporting the piezoelectric element 102 and the driving shaft 103, a weight member (weight) 105 mounted on the other end along the axial direction of the piezoelectric element 102, a friction member 106 making a frictional engagement with the driving shaft 103 so as to move in the axial direction and a zoom lens (driven member) 107 fixed to the friction member 106. In order to adjust the focus of the zoom lens 107 in automatic focusing, the piezoelectric element 102 is used to drive the zoom lens 107 along the optical axis direction, for example, up to 1 mm.

The piezoelectric element 102 is made, for example, by laminating ceramic and the like. A lead wire 108 is electrically connected to the piezoelectric element 102. Next, the piezoelectric element 102 elongates and contracts in an axial direction (hereinafter, the axial direction is referred to as elongating and contracting direction A) when electric signals to be described later are applied via the lead wire 108 from a controller (not shown). In the present embodiment, the piezoelectric element 102 is used as an electro-mechanical conversion element but, for example, artificial muscle polymers and the like may be used, as long as they can elongate and contract according to input of an electric signal.

A driving shaft 103 is light in weight and great in strength. This is made, for example, with carbon graphite or beryllium alloy and available in a cylindrical shape. The driving shaft 103 is arranged coaxially with the piezoelectric element 102, in contact with one end surface 102 of the piezoelectric element 102 in the elongating and contracting direction A and bonded via an adhesive agent 109. The driving shaft 103 is not limited to a cylindrical shape but may be available in a rectangular shape.

A stationary member 104 functions as a frame (frame member) for assembling the piezoelectric element 102 and the driving shaft 103. The stationary member 104 is provided with a front bearing 104a, which is a front wall constituting the frame on the left side as shown in the figure and an intermediate bearing 104b, which is an intermediate wall at the mid-point of the elongating and contracting direction A. The front bearing 104a is provided with a hole 104c, and the intermediate bearing 104b is provided with a hole 104d at a coaxial position with the hole 104c, and the driving shaft 103 is movably inserted into the hole 104c and the hole 104d. In this case, the hole 104d is a tapered surface 116 on the side of the piezoelectric element 102 in order to avoid an interference of the piezoelectric element 102 with an adhesive agent 109 forming a joint with the driving shaft 103. A rear end of the stationary member 104 shown on the right side in the figure is opened, and a protective plate 110 formed by bending a thin plate is attached to the rear end.

A weight member 105 abuts against the other end surface 102b of the piezoelectric element 102 in the elongating and contracting direction A, not in contact with the stationary member 104 and the protective plate 110, and bonded via an adhesive agent 112. The weight member 105 applies a load to the other end surface 102b of the piezoelectric element 102, thereby preventing that the driving shaft 103 does not move in the elongating and contracting direction A, and the piezoelectric element 102. At the same time, the application of a load also decreases the resonance frequency and eliminates disturbance of irregularities in the frequency characteristics. Therefore, a material which is soft and also greater in mass than the driving shaft 103 is used as the weight member 105.

For example, where the driving shaft 103 is 8 mg and the piezoelectric element 102 is 32 mg, a weight member of 32 mg is used as a heavy weight member. Further, a member made of a flexible material is used as a soft weight member and a member smaller in Young's modulus than the piezoelectric element 102 or the driving shaft 103 is used. The Young's modulus is preferably 1 Gpa or lower and more preferably 300 Mpa or lower. Such a flexible material is prepared by mixing metal powders higher in specific gravity, for example, with an elastic body such as rubber and elastomer. They are prepared by mixing powders such as tungsten with, for example, urethane rubber or urethane resin. The weight member 105 is preferably as high as possible in specific gravity, in view of miniaturization of equipment and, for example, in a range of 8 to 12.

The friction member 106 is frictionally engaged with a driving shaft 103 at a predetermined frictional force so as to slide. More specifically, as shown in FIG. 17, the driving shaft 103 advances into a V-shaped groove 114 mounted on a friction member body 113, and a blade spring 115 is attached so that the driving shaft 103 is urged to the friction member body 113. As will be described later, a predetermined frictional force between the friction member 106 and the driving shaft 103 is established to be greater than a driving force of the driving shaft 103 on a relatively gradual elongation and contraction of the piezoelectric element 102 and also smaller than a driving force of the driving shaft 103 on an abrupt elongation and contraction of the piezoelectric element 2.

The zoom lens 107 is to be moved by a driving mechanism 101e and, as shown in FIG. 23, fixed to the friction member body 113 of the friction member 106 so that the optical axis direction is in parallel with the axial direction of the driving shaft 103. Thereby, the friction member 106 and the zoom lens 107 are driven in an integrated manner. Fixed lenses (not shown) are fixed to the stationary member 104 respectively at the front and rear sides along the optical axis direction of the zoom lens 107. The zoom lens 107 and the fixed lenses constitute a photographic optical system of a camera.

In particular, in the present embodiment, a first adhesion portion 117 is provided between a tapered surface at an intermediate bearing 104b of a stationary member 104 and a driving shaft 103. The driving shaft 103 is elastically supported by the stationary member 104 by means of the first adhesion portion 117. A second adhesion portion 118 is provided at a range from the mid-point of the elongating and contracting direction A of the piezoelectric element 102 to the intermediate bearing 104b of the stationary member 104 inside the stationary member 104. The piezoelectric element 102 is elastically supported by the stationary member 104 by means of the second adhesion portion 118.

The first adhesion portion 117 functions as a first filler for supporting the driving shaft 103 and the second adhesion portion 118 functions as a first filler for supporting the piezoelectric element 102.

The actuator comprising a piezoelectric element 102, a driving shaft 103 and a driven member 106 is supported laterally by the piezoelectric element 102 in the elongating and contracting direction via a second adhesive agent 118. In this case, it is preferable to support the actuator in a direction orthogonal to the elongating and contracting direction of the piezoelectric element 102. The second adhesive agent 118 functions as an attachment member for supporting laterally the actuator for attachment.

The first adhesion portion 117 is formed by filling, for example, an instantaneous adhesive agent which is fast-curing and elastic, and the second adhesion portion 118 is formed by filling, for example, a silicone adhesive agent which is soft, relatively low in specific gravity and also relatively high in viscosity. The silicone adhesive agent has preferably shore hardness of 50 or lower and more preferably from 30 to 40.

The thus constituted driving mechanism 101e is obtained as follows: the driving shaft 103 is bonded to the one end surface 102a of the piezoelectric element 102 via an adhesive agent 109, the weight member 105 is also bonded to the other end surface 102b of the piezoelectric element 102 via an adhesive agent 112, a driving shaft 103 is inserted into a hole 104c of a front bearing 104a and a hole 104d of an intermediate bearing 104b, while the piezoelectric element 102 and the weight member 105 are allowed to insert into the stationary member 104, a friction member 106 equipped with a zoom lens 107 is attached to the driving shaft 103, a first adhesion portion 117 is provided and Next a second adhesion portion 118 is provided to elastically support the piezoelectric element 102, and finally a protective plate 110 is attached to the stationary member 104.

Here, a further detailed description is given for a method for forming the first adhesion portion 117 and the second adhesion portion 118. First, an adhesive agent is filled at a predetermined quantity from above into a space between a tapered surface at the intermediate bearing 104b of the above-described stationary member 104 and the driving shaft 103. The adhesive agent is a fast-curing adhesive agent and cured instantly to form the first adhesion portion 117, by which the driving shaft 103 is temporarily fixed to the stationary member 104 and also elastically supported.

After the first adhesion portion 117 is formed, an adhesive agent is filled at a predetermined quantity from above into the driving shaft 103 of the piezoelectric element 102 which is inside the stationary member 104, thereby forming the second adhesion portion 118. Therefore, the first adhesion portion 117 and the second adhesion portion 118 support the piezoelectric element 102, following elongation and contraction of the piezoelectric element 102.

In the above-described driving mechanism 101e, where a zoom lens 107 is moved, for example, as shown in FIG. 2A and FIG. 2B, a substantially serrate pulse voltage is continuously applied to the piezoelectric element 102.

More specifically, on application of a pulse voltage shown in FIG. 2A, the piezoelectric element 102 is elongated in a relatively gradual manner from a time $\alpha 1$ to a time $\alpha 2$, and the driving shaft 103 moves to the left as shown at a relatively slow speed (hereinafter, referred to as "advancement"). In this case, since inertia working between a friction member 106 and a zoom lens 107 is smaller than a frictional force between the friction member 106 and the driving shaft 103, the friction member 106 and the zoom lens 107 advance in an integrated manner, together with the driving shaft 103, by the frictional force. At a time $\alpha 3$, the piezoelectric element 102 is abruptly contracted and the driving shaft 103 moves to the right as shown at a greater speed (hereinafter referred to as "retraction"). In this case, since inertia working between the friction member 106 and the zoom lens 107 is greater than a frictional force between the friction member 106 and the driving shaft 103, only the driving shaft 103 moves backward, while the friction member 106 and the zoom lens 107 hardly move in practice. Therefore, the pulse voltage shown in FIG. 2A is continuously applied to repeat such a motion, thereby allowing the zoom lens 107 to advance.

In contrast, on application of the pulse voltage shown in FIG. 2B, the wave pattern of the pulse voltage is reversed to that shown in FIG. 2A in the gradual and abrupt movement. Therefore at a time $\beta 1$, only the driving shaft 103 move backward and the friction member 106 and the zoom lens 107 hardly moves in practice, whereas at a time $\ominus 2$ to a time $\beta 3$, the friction member 106 and the zoom lens 107 retract in an integrated manner, together with the driving shaft 103. Therefore, the pulse voltage shown in FIG. 2B is continuously applied to repeat such a motion, thereby allowing the zoom lens 107 to retract.

In the driving mechanism 101e of the seventh embodiment where the above-described driving is conducted, the piezoelectric element 102 is elastically supported by the stationary member 104 by means of a first adhesive portion 117 and a second adhesive portion 118. Therefore, for example, even where the driving mechanism 101e is dropped to give an impact force thereto, an elastic force kept by the first adhesive portion 117 and the second adhesive portion 118 acts to alleviate the impact force, thereby making it possible to prevent breakage of individual parts and joints of the driving mechanism 101e. Further, the elastic force is able to suppress the transmission of vibration between the stationary member 104 and the piezoelectric element 102 and also to prevent the effect of resonance, thereby making it possible to move the driving shaft 103 in the elongating and contracting direction A reliably and accurately. As described above, since the piezoelectric element 102 is supported elastically, it is possible to suppress effectively warpage and deflection on the driving shaft 103 of the piezoelectric element 102 and also move the driving shaft 103 further reliably and accurately. Therefore, such a problem is solved that when the piezoelectric element 102 is not supported, the driving shaft 103 does not move but the piezoelectric element 102 moves, making it possible to move the driving shaft 103 further reliably and accurately.

Further, since the piezoelectric element 102 is not fixed to the stationary member 104 but elastically supported, it is possible to prevent the driving shaft 103 of the stationary member 104 and the piezoelectric element 102 from being excessively restrained. As a result, it is possible to prevent not only unnecessary actions of stress which develop at a joint of the stationary member 104 with the driving shaft 103 but also breakage of the joint.

Further, since the first adhesive portion 117 is provided and the second adhesive portion 118 is Next provided, the first adhesive portion 117 is used to temporarily fix the driving shaft 103, by which the second adhesion portion 118 can be formed easily, thereby increasing the productivity. The adhesion portion 117 is provided on-an intermediate bearing 104b adjacent to the second adhesion portion 118, thereby making it possible to prevent an adhesive agent before curing from being discharged from the second adhesion portion 118 to the piezoelectric element 102 in the elongating and contracting direction A. It is, therefore, possible to prevent the driving shaft 103 from being contaminated to result in a driving failure and to obtain desired driving characteristics.

Further, the present embodiment has the following actions and effects. Namely, since the piezoelectric element 102 is elastically supported on the driving shaft 103, it is possible to suppress more effectively warpage and deflection on the driving shaft 103 of the piezoelectric element 102 and also move the driving shaft 103 further reliably and accurately. In addition, in this case, as compared with a case where an entire part of the piezoelectric element 102 is elastically supported on a stationary member 104, the piezoelectric element 102 is not suppressed for elongation and contraction, thereby making it possible to move the driving shaft 103 further reliably and accurately.

Still further, since the second adhesion portion 118 is provided up to the intermediate bearing 104b, a joint of the piezoelectric element 102 with the driving shaft 103 is also elastically supported to increase the strength of the joint. As a result, a possible breakage of the joint can be prevented.

In addition, since a weight member 105 is provided on the other end of the piezoelectric element 102 in the elongating and contracting direction A, such a possibility is further reliably removed that the driving shaft 103 will not move to the piezoelectric element 102 in the elongating and contracting direction A but the piezoelectric element 102 will move, and the driving shaft 103 is allowed to move further reliably and accurately. Also, since the weight member 105 is soft and heavy, it is possible to reduce the resonance frequency of the driving mechanism 101e to drive the piezoelectric element 102 in a range free from any adverse effect of resonance. At the same time, it is possible to eliminate disturbance of irregularities in the frequency characteristics to suppress more effectively the warpage and deflection of the piezoelectric element 102 which may displace in a direction other than the elongating and contracting direction A and also to move the driving shaft 103 further reliably and accurately. Also, since the weight member 105 is not supported by the second adhesion portion 118, it is possible to exhibit effectively the above-described actions and effects of the weight member 105.

Further, in the present embodiment, the second adhesion portion 118 is provided up to the intermediate bearing 104b of the stationary member 104. However, a clearance may be provided between the piezoelectric element 102 and the intermediate bearing 104b.

Further, there is a possibility that the first adhesion portion 117 which is temporarily fixed may drop during or after the operation of the driving shaft 103. However, in this case, this should pose no problem, because the piezoelectric element 102 is elastically supported by the second adhesion portion 118.

In the present embodiment, it may be possible that in place of the elastic adhesive agent 111, for example, an elastic annular body such as rubber is fitted into the piezoelectric element 102 and elastically supported by a stationary member 104. However, in this case, it is not preferable because the number of parts constituting the driving mechanism 101 is increased, and adhesion between the piezoelectric element 102 and the elastic annular body and between the annular body and the stationary member 104 is further required.

Figure 24:
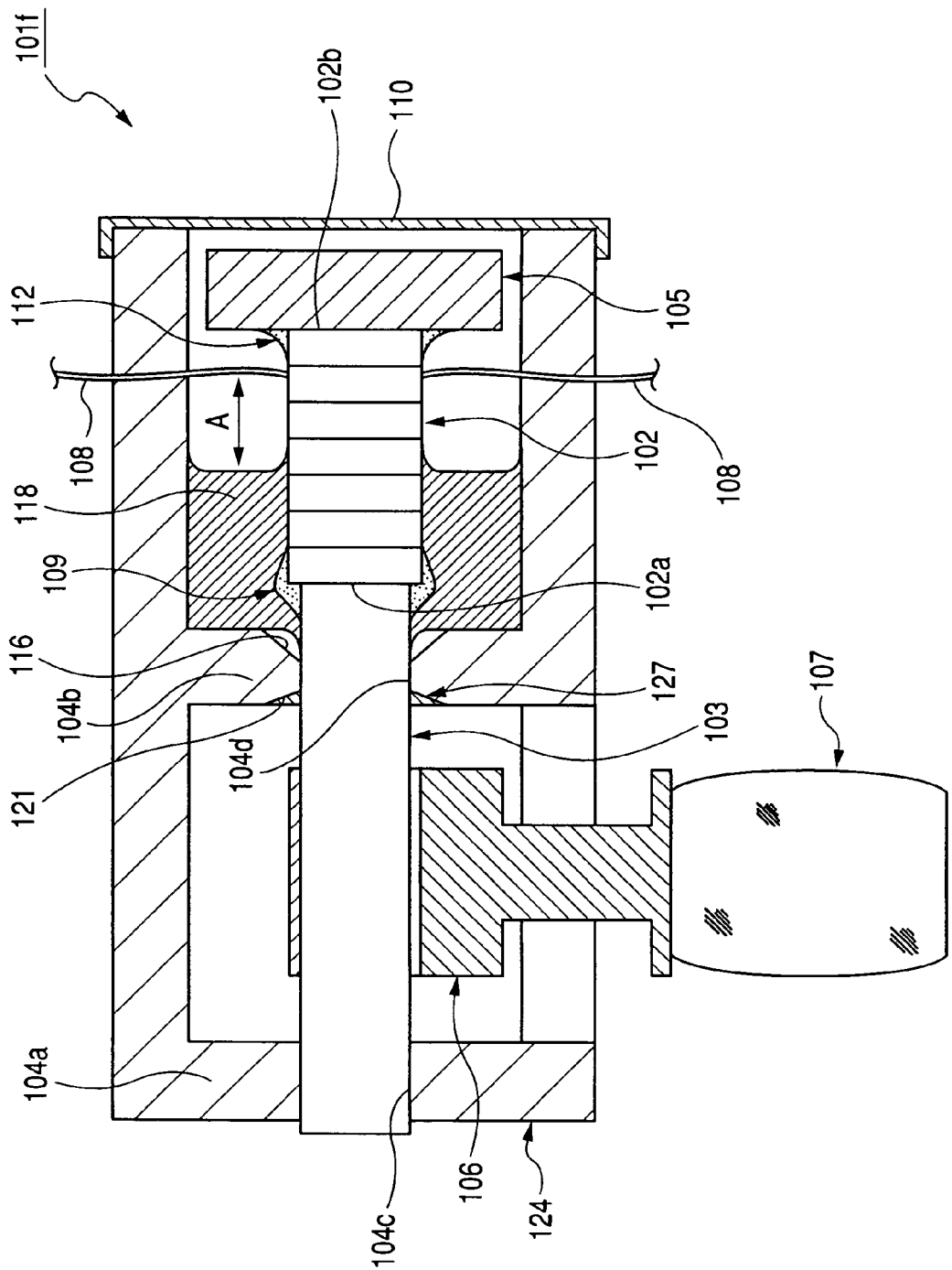
FIG. 24 is a longitudinal sectional view showing a modification of the driving mechanism according to the seventh embodiment of the present invention.

FIG. 24 is a longitudinal sectional view showing a modification of the driving mechanism according to the seventh embodiment. The driving mechanism 101f of the modification is different from the driving mechanism 101e in that in place of the stationary member 104, a stationary member 124 is used which has a tapered surface 121 on a friction member 106 (left side as shown) at a hole 104d of an intermediate bearing 104b and in place of the first adhesion portion 117, an adhesive agent is filled into a space between the tapered surface 121 and the driving shaft 103 to give a first adhesion portion 127.

The thus constituted driving mechanism 101f is also able to provide an effect similar to that of a driving mechanism 101e because, as with the driving mechanism 101e, the first adhesion portion 127 functions to be a temporary fixture and also prevents an adhesive agent from being discharged from the second adhesion portion 118. As a matter of course, other effects are similar to those of the driving mechanism 101e.

Figure 25:
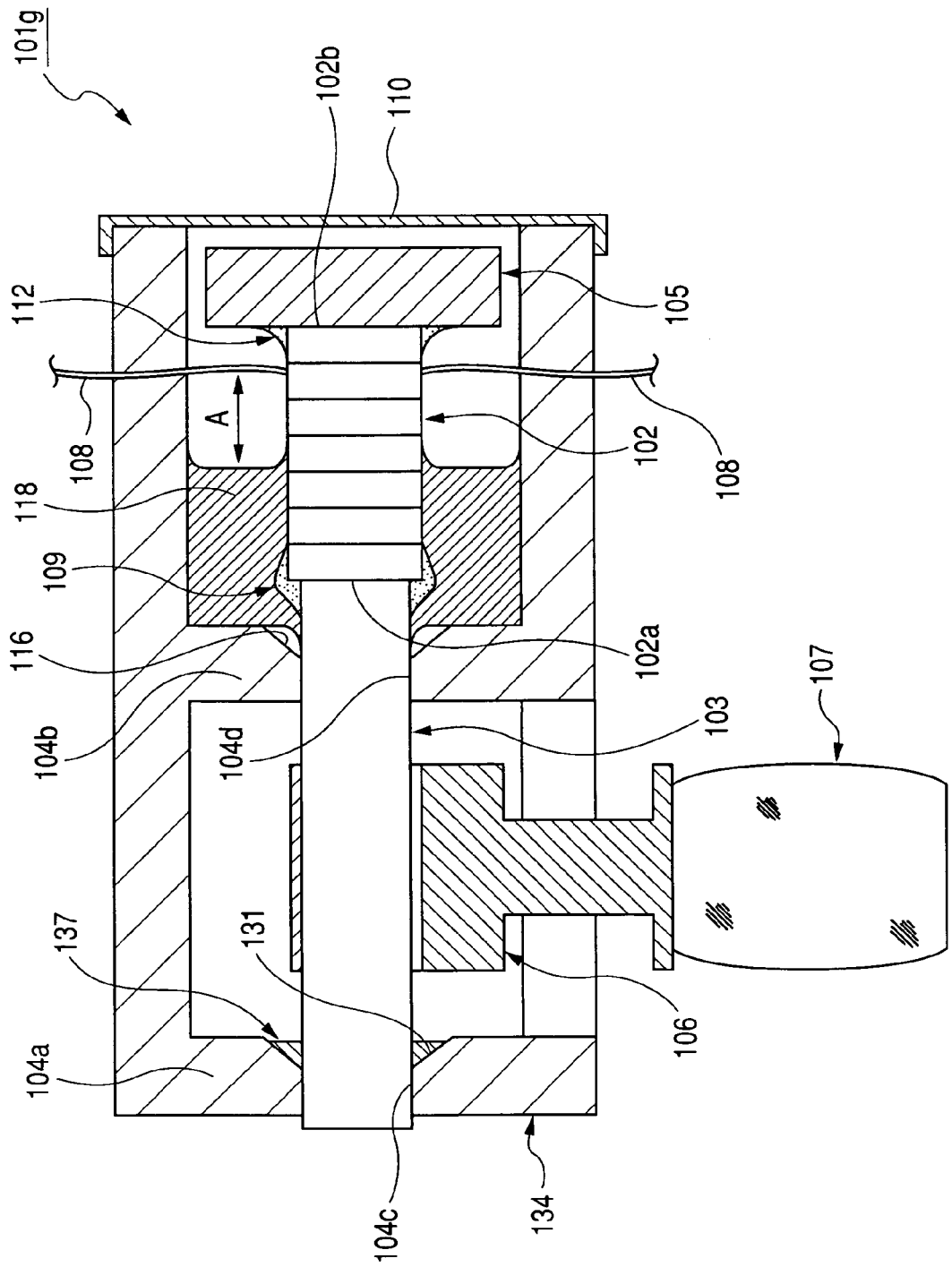
FIG. 25 is a longitudinal sectional view showing a modification of the driving mechanism according to the seventh embodiment of the present invention.

FIG. 25 is a longitudinal sectional view showing another modification of the driving mechanism according to the seventh embodiment. The driving mechanism 101g of the modification is different from the driving mechanism 101e in that in place of the stationary member 104, a stationary member 134 is used which has a tapered surface 131 on a friction member 106 (to the right as shown) at a hole 104c of a front-side bearing 104a and in place of the first adhesion portion 117, an adhesive agent is filled into a space between the tapered surface 131 and the driving shaft 103 to give a first adhesion portion 137.

The thus constituted driving mechanism 101g is also able to easily form the adhesion portion 118 and increase productivity, because, as with the driving mechanism 101e, the first adhesion portion 137 functions to be a temporary fixture. As a matter of course, other effects are similar to those of the driving mechanism 101e.

Figure 26:
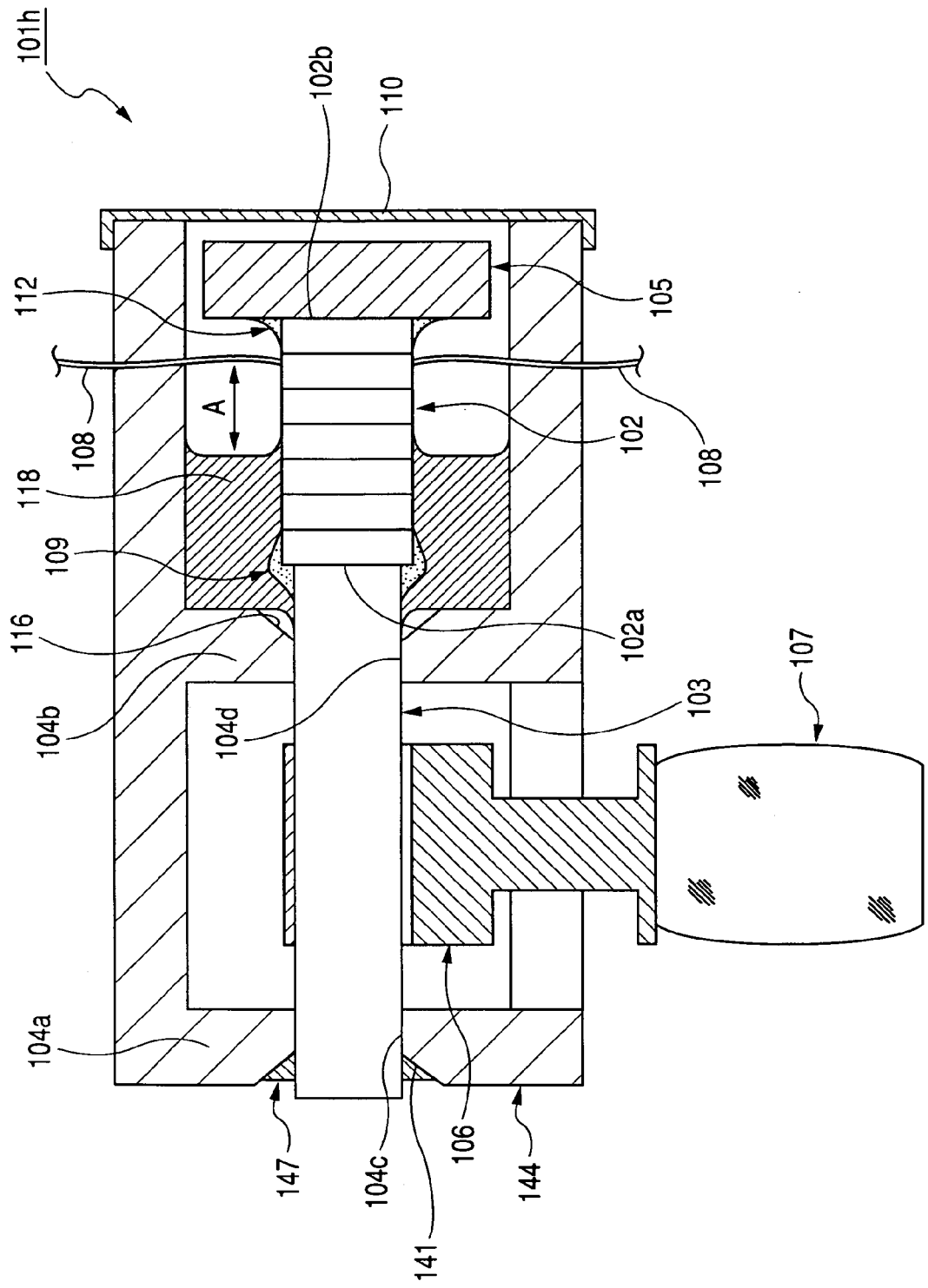
FIG. 26 is a longitudinal sectional view showing a modification of the driving mechanism according to the seventh embodiment of the present invention.

FIG. 26 is a longitudinal sectional view showing another modification of the driving mechanism according to the seventh embodiment. The driving mechanism 101h of the modification is different from the driving mechanism 101g in that in place of the stationary member 34, a stationary member 144 is used which has a tapered surface 141 opposite a friction member 106 (left side as shown) at a hole 104c of a front-side bearing 104a and in place of the first adhesion portion 137, an adhesive agent is filled into a space between the tapered surface 141 and the driving shaft 103 to give a first adhesion portion 147.

The thus constituted driving mechanism 101h is also able to provide effects similar to those of the driving mechanism 101g.

An explanation has been so far made for preferable embodiments of the present invention, to which the present invention is not limited. For example, in the above-described embodiment, it is particularly preferable to provide a tapered surface at a hole of a bearing thereby forming a first adhesion portion between the tapered surface and the driving shaft 103. However, without the tapered surface, it may be constructed that the end surface of the bearing and peripheral surface of the driving shaft 3 are contacted to each other in a fillet shape.

Further, in the above-described embodiment, it is particularly preferable that a first adhesion portion and a second adhesion portion are respectively provided at a single site inside a stationary member. However, the first adhesion portion may be provided at a plurality of positions inside the stationary member and the second adhesion portion may be provided at a plurality of positions inside the stationary member.

Further, in the above-described embodiment, it is particularly preferable that the driving shaft 103 of the piezoelectric element 102 is supported by the second adhesion portion. However, the weight member 105 may be supported by the second adhesion portion, or an entire part of the piezoelectric element 102 may be supported by the second adhesion portion.

Further, in the above embodiment, when an adhesive agent is filled to form a second adhesion portion, the viscosity is utilized to keep the filling. However, for example, a jig is used or a stationary member is provided on a partition wall to fill the adhesive agent, thereby making it possible to prevent more effectively the adhesive agent from being discharged from the second adhesion portion to the piezoelectric element 102 in the elongating and contracting direction A.

Further, in the above-described embodiment, the other end of the piezoelectric element 102 in the elongating and contracting direction A is as a free end. However, the other end thereof may be fixed to a stationary member or a protective plate 110 and used as a fixed end.

Further, in the above-described embodiment, a weight member 105 is provided on the other end of the piezoelectric element 102 in the elongating and contracting direction A, and it is particularly preferable that the weight member 105 is soft and also heavy. However, the present invention is not limited thereto. In addition, the weight member 105 is used to increase mobility of the driving shaft 3 in the elongating and contracting direction A. However, the weight member 105 may not be used.

Further, in the above-described embodiment, the frequency of the pulse voltage applied to the piezoelectric element 102 is equal where the zoom lens 107 is advanced or retracted. However, it may be different.

Further, in the above-described embodiment, the driven member is used as a zoom lens 107. However, a lens frame may be used for supporting the zoom lens 107 or others may be used for this purpose.

Still further, in the above-described embodiment, it is particularly preferable that the electro-mechanical conversion element 102 and the driving shaft 103 are elastically supported by the stationary member 104 via an adhesive agent. The stationary member 104 may be supported by use of a rigid adhesive agent, although the effect is reduced to some extent.

There is also a case where the second adhesion portion is not adhered. In this case, the first adhesion portion is used also as the adhesion portion.

In the driving mechanisms according to the above-described fifth, the sixth and the seventh embodiments, where a filler such as an adhesive agent is used to support an actuator, it is preferable to provide the filler so as to cover a joint of a piezoelectric element 102 with a wiring member such as a lead wire 108. In this case, it is possible to increase the joint strength of the wiring member. Therefore, even in a case where a great stress is exerted to a joint of the piezoelectric element 102 with the lead wire 108, it is possible to suppress that the lead wire 108 may be removed to fall down. It is also possible to suppress that the lead wire 108 may bend down excessively to be cut out. Further, in a case where a great stress is exerted to a joint of the lead wire 108, it is possible to suppress that scattering substances such as solder and flux may remain at the joint. In contrast, where a joint is not covered and a great stress is exerted thereto, scattering substances may attach on a frictionally engaged portion between a driving member 103 and a friction member 106 to result in a situation where equipment is not properly driven, or they may attach on a zoom lens 107 to result in a deteriorated optical performance. However, where a filler is used to cover a joint of a wiring member, it is possible to significantly suppress the development of the situation.

The above-described individual embodiments show certain examples of the driving mechanism in the present invention. A driving mechanism according to the present invention is not limited to the driving mechanisms described in these embodiments, but the driving mechanisms described in these embodiments may be modified or applied to others as long as they are not deviated from the scope described in each Claim. In the present embodiment, an explanation was made, for example, for the driving mechanism to drive the zoom lens, but may be applied to a driving mechanism to drive an object other than a zoom lens.

According to the present invention, an actuator is supported in such a way to reduce the effect of resonance, making it possible to suppress the transmission of vibration between the actuator and an external member and therefore to move a driven member correctly.

The entire disclosure of each and every foreign patent application from which the benefit of foreign priority has been claimed in the present application is incorporated herein by reference, as if fully set forth.

What is claimed is:

1. A driving mechanism, comprising:
   a case having a frame and a protective plate attached to the frame, the frame and the protective plate defining a chamber;
   an actuator comprising:
      an electro-mechanical conversion element, and
      a driving member which moves according to elongation and contraction of the electro-mechanical conversion element, and attached to a first end of the electro-mechanical conversion element;
   a weight member attached to a second end, opposite to the first end, of the electro-mechanical conversion element, the weight member being accommodated inside the chamber and made of an elastically deformable member and an exterior circumference of the weight member being spaced apart from the frame and the protective plate, such that an open space is defined between the protective plate and an entire surface, of the weight member, that opposes the protective plate; and
   a driven member frictionally engaged with the driving member,
   wherein the actuator allows the driven member to move along the driving member, and
   the actuator is supported by the case laterally in elongating and contracting directions of the electro-mechanical conversion element.

2. The driving mechanism as set forth in claim 1, wherein the actuator is supported by the case by means of support members.

3. The driving mechanism as set forth in claim 1, wherein the actuator is supported by the case via a filler.

4. The driving mechanism as set forth in claim 3, wherein the filler is formed by an adhesive agent.

5. The driving mechanism as set forth in claim 3, the filler is constituted by a plurality of adhesive agents.

6. The driving mechanism as set forth in claim 2, wherein the support member has elasticity.

7. The driving mechanism as set forth in claim 3, wherein the filler has elasticity.

8. The driving mechanism as set forth in claim 3, wherein the case comprises a partition wall for preventing discharge of the filler.

9. A driving mechanism, comprising:
   an actuator comprising:
      an electro-mechanical conversion element; and
      a driving member which moves according to elongation and contraction of the electro-mechanical conversion element;
   a driven member frictionally engaged with the driving member;
   a case;
   a first filling portion for supporting the driving member to the case; and a second filling portion for supporting the electro-mechanical conversion element to the case, wherein the actuator allows the driven member to move along the driving member, and the actuator is supported by the case laterally in elongating and contracting directions of the electro-mechanical conversion element.

10. The driving mechanism as set forth in claim 9, wherein the first filling portion is for a temporary fixture.

11. The driving mechanism as set forth in claim 9, wherein the first filling portion is a bearing for supporting the driving member in the vicinity of the electro-mechanical conversion element and is provided at a portion adjacent to the second filling portion.

12. A driving mechanism, comprising:

an actuator comprising:

an electro-mechanical conversion element; and a driving member which moves according to elongation and contraction of the electro-mechanical conversion element;

a driven member frictionally engaged with the driving member; and a case, wherein the actuator allows the driven member to move along the driving member, the actuator is supported by the case laterally in elongating and contracting directions of the electro-mechanical conversion element, wherein the actuator is supported by the case by means of support members, wherein the electro-mechanical conversion element has on its outer surface a terminal to which a wiring member for inputting electric signals is connected, and the support member covers a portion connecting the terminal with the wiring member.

13. A driving mechanism, comprising:

an actuator comprising:

an electro-mechanical conversion element; and a driving member which moves according to elongation and contraction of the electro-mechanical conversion element;

a driven member frictionally engaged with the driving member; and a case, wherein the actuator allows the driven member to move along the driving member, and the actuator is supported by the case laterally in elongating and contracting directions of the electro-mechanical conversion element, wherein the actuator is supported by the case via a filler, wherein the electro-mechanical conversion element has on its outer surface an terminal to which a wiring member is connected for inputting electric signals, and the filler covers a portion connecting the terminal with the wiring member.

14. The driving mechanism as set forth in claim 1, wherein the driving member is supported on at least one of its leading end side and its base end side, so as to move in elongating and contracting directions of the electro-mechanical conversion element.

15. The driving mechanism as set forth in claim 1, wherein the actuator is supported so as to move in elongating and contracting directions of the electro-mechanical conversion element.

16. The driving mechanism as set forth in claim 1, further comprising a driving section that generates asymmetric signals in the elongating and contracting directions so as to drive the electro-mechanical conversion element.

17. The driving mechanism as set forth in claim 1, wherein the driven member is in surface contact with the driving member.

18. The driving mechanism as set forth in claim 1, further comprising a detecting section that detects a movement position of the driven member.

19. The driving mechanism as set forth in claim 1, wherein the electro-mechanical conversion element is driven at a driving frequency exceeding an audible frequency.

20. The driving mechanism as set forth in claim 1, wherein the driven member is an optical member or a member attached to the optical member and is used for a photographic optical system.

21. The driving mechanism as set forth in claim 1, wherein the actuator is used in a photographic optical system mounted on a cellular phone.

22. The driving mechanism as set forth in claim 1, wherein the weight member is made of a material which is heavier than the driving member.

23. A driving mechanism, comprising:

an actuator comprising:

an electro-mechanical conversion element;

a driving member which moves according to elongation and contraction of the electro-mechanical conversion element, and attached to a first end of the electro-mechanical conversion element; and a weight member attached to a second end, opposite to the first end, of the electro-mechanical conversion element, the weight member being made of an elastically deformable member;

a driven member frictionally engaged with the driving member; and a case, wherein the actuator allows the driven member to move along the driving member, and the actuator is supported by the case laterally in elongating and contracting directions of the electro-mechanical conversion element, wherein the weight member is a mixture of mixing metal powders and an elastically deformable member.

24. The driving mechanism as set forth in claim 23, wherein the weight member includes a mixture of urethane rubber and urethane resin with tungsten powders.

* * * * *